US007796410B2

(12) United States Patent
Takayanagi et al.

(10) Patent No.: US 7,796,410 B2
(45) Date of Patent: Sep. 14, 2010

(54) SWITCHING POWER SUPPLY UNIT

(75) Inventors: Yoshinobu Takayanagi, Tokyo (JP);
Kunihiro Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 309 days.

(21) Appl. No.: 11/976,887

(22) Filed: Oct. 29, 2007

(65) Prior Publication Data

US 2008/0101096 A1 May 1, 2008

(30) Foreign Application Priority Data

Oct. 31, 2006 (JP) ............................. 2006-296724

(51) Int. Cl.
*H02M 5/45* (2006.01)
(52) U.S. Cl. .............................. 363/37; 307/66; 320/15
(58) Field of Classification Search ............. 363/16–20, 363/34–39, 43, 67; 323/222, 282–284, 269; 307/64–66; 320/15, 103, 119
See application file for complete search history.

(56) References Cited

U.S. PATENT DOCUMENTS 5,982,645 A * 11/1999 Levran et al. ................. 363/37
6,330,170 B1 * 12/2001 Wang et al. ................... 363/37

FOREIGN PATENT DOCUMENTS

| JP | A 08-317508 | 11/1996 |
|---|---|---|
| JP | A 08-317575 | 11/1996 |
| JP | A 09-065509 | 3/1997 |

OTHER PUBLICATIONS

Katkut et al., "Design Considerations for Power Converters Supplying the SAE J-1773 Electric Vehicle Inductive Coupler," Applied Power Electronics Conference and Exposition, 1997, APEC '07 Conference Proceedings, Twelfth Annual, Atlanta, GA, USA, IEEE, 1997, pp. 841-847, vol. 2.
Extended European Search Report issued Feb. 12, 2010 in EP 07 02 1219.

* cited by examiner

Primary Examiner—Rajnikant B Patel
(74) Attorney, Agent, or Firm—Oliff & Berridge, PLC

(57) ABSTRACT

Provided is a switching power supply unit being able to perform voltage conversion between two DC power supplies, and perform appropriate charge operation based on an inputted AC voltage. When a main battery is preferentially charged, an SW control section performs control such that a duty ratio is fixed in switching operation of a switching circuit, and a duty ratio is variable in switching operation of a bidirectional switching circuit. On the other hand, when an accessory battery is preferentially charged, the SW control section performs control such that a duty ratio is variable in switching operation of each of the switching circuit and the bidirectional switching circuit. When the accessory battery is preferentially charged, the SW control section may perform control such that the duty ratio is fixed in switching operation of the switching circuit, and a duty ratio is variable in switching operation of a switching element.

8 Claims, 13 Drawing Sheets

SWITCHING POWER SUPPLY UNIT

BACKGROUND OF THE INVENTION

1. Field of the Invention

The present invention relates to a switching power supply unit configured to produce switching output obtained by switching a DC input voltage at an output winding of a power conversion transformer.

2. Background Art

Generally, an electric vehicle is equipped with a low voltage battery (accessory battery) for outputting a low DC voltage such as about 14 V as a power supply for driving in-vehicle instruments (accessories) such as a wiper, a headlight, a room light, an audio instrument, an air conditioner, and various measuring instruments, and equipped with a high voltage battery (main battery) for outputting a high DC voltage such as about 350 to 500 V as a power supply for driving a motor. Typically, charge operation to such a low voltage battery is performed by rectifying an AC output voltage from an AC generator driven in terms of rotation of an engine to obtain a high DC voltage, and converting such a DC input voltage into a relatively low DC voltage using a switching power supply unit (DC/DC converter), and then supplying the low DC voltage to the low voltage battery. Charge operation to the high voltage battery is performed by supplying the DC input voltage from an engine to the high voltage battery. For example, as described in Japanese Unexamined Patent Publication No. 8-317508, the switching power supply unit performs voltage conversion by temporarily converting a DC input voltage into an AC voltage using an inverter circuit, then transforming the AC voltage using a voltage conversion transformer and reconverting the transformed AC voltage into a DC voltage using a rectifier circuit or the like.

SUMMARY OF THE INVENTION

Here, the Japanese Unexamined Patent Publication No. 8-317508 discloses a switching power supply unit having such a function of the DC/DC converter, in addition, a function of charging the high voltage battery and the low voltage battery using an AC voltage inputted from a so-called commercial power supply. According to such a switching power supply unit, it is considered that when the switching power supply unit is applied to, for example, an electric vehicle, even if an engine is stopped and a DC input voltage is not supplied to the high voltage battery, the high voltage battery and the low voltage battery can be charged so that accessories can be driven.

However, in the Japanese Unexamined Patent Publication No. 8-317508, no description was made on a specific charge method considering presence of two batteries of the high voltage battery and the low voltage battery. Therefore, an appropriate method of charging the two batteries is desired.

In view of forgoing, it is desirable to provide a switching power supply unit that may perform voltage conversion between two DC power supplies, and perform appropriate charge operation to the DC power supplies based on an inputted AC voltage.

A first switching power supply unit of an embodiment of the invention includes a transformer including a first transformer coil, a second transformer coil, and a third transformer coil, the transformer coils being magnetically coupled with one another; a first switching circuit disposed between the first transformer coil and a first DC power supply, and configured to include bidirectional switches; a rectifier circuit disposed between the second transformer coil and a second DC power supply; a second switching circuit disposed between the third transformer coil and AC voltage input terminals; and a switching control section performing control such that when the first DC power supply is assigned higher priority in charging, a switching duty ratio in the second switching circuit is set to be fixed, and a switching duty ratio in the first switching circuit is set to be variable, and when the second DC power supply is assigned higher priority in charging, the switching duty ratio in the second switching circuit is set to be variable, and the first switching circuit performs switching operation. "AC input voltage" means a voltage used as a power voltage for an electronic instrument, or so-called commercial voltage. "Preferentially" means "mainly". Each of the first to third transformer coils may be made up of a single coil or a plurality of coils.

In the first switching power supply unit of an embodiment of the invention, when a DC input voltage is supplied from the first DC power supply, and the first switching circuit acts as an inverter circuit, an inputted DC input voltage is converted into a pulse voltage by the first switching circuit, and the pulse voltage is transformed by the transformer. The transformed pulse voltage is rectified by the rectifier circuit, and then supplied to the second DC power supply as a DC output voltage. On the other hand, when an AC input voltage is inputted from the AC voltage input terminals, a pulse voltage based on the AC input voltage is generated by the second switching circuit, and the first switching circuit acts as a rectifier circuit. Therefore, a voltage is supplied to at least one of the first switching circuit and the rectifier circuit based on the inputted AC input voltage, so that a DC voltage is supplied to at least one of the first DC power supply and the second DC power supply. Accordingly, even if the DC input voltage is not supplied from the first DC power supply, charge operation to the second DC power supply can be performed. In the case of charging the DC power supplies, when the first DC power supply is preferentially charged, control is performed such that a duty ratio is fixed in switching operation of the second switching circuit, and a duty ratio is variable in switching operation of the first switching circuit. On the other hand, when the second DC power supply is preferentially charged, control is performed such that the duty ratio is variable in switching operation of the second switching circuit, and the first switching circuit performs switching operation.

In the first switching power supply unit of an embodiment of the invention, preferably, a power factor correction circuit is further provided between the second switching circuit and the AC voltage input terminals. In the case of such a configuration, a power factor is improved in voltage conversion of the AC input voltage, consequently harmonic components are reduced.

A second switching power supply unit of an embodiment of the invention includes a transformer including a first transformer coil, a second transformer coil, and a third transformer coil, the transformer coils being magnetically coupled with one another; a first switching circuit disposed between the first transformer coil and a first DC power supply; a rectifier circuit disposed between the second transformer coils and a second DC power supply; a second switching circuit disposed between the third transformer coil and AC voltage input terminals; a power factor correction circuit disposed between the second switching circuit and the AC voltage input terminals, and configured to include a switching element; and a switching control section performing control such that when the first DC power supply is assigned higher priority in charging, a switching duty ratio in the second switching circuit is set to be fixed, and a switching duty ratio in the first switching circuit is set to be variable, and when the second DC power supply is assigned higher priority in charging, at least one of the switching duty ratio in the second switching circuit and a switching duty ratio in the switching element in the power factor correction circuit is set to be variable based on amount of charge of the second DC power supply, and the first switching circuit performs switching operation.

In the second switching power supply unit of an embodiment of the invention, when a DC input voltage is supplied from the first DC power supply, and the first switching circuit acts as an inverter circuit, an inputted DC input voltage is converted into a pulse voltage by the first switching circuit, and the pulse voltage is transformed by the transformer. The transformed pulse voltage is rectified by the rectifier circuit, and then supplied to the second DC power supply as a DC output voltage. On the other hand, when an AC input voltage is inputted from the AC voltage input terminals, a pulse voltage based on the AC input voltage is generated by the second switching circuit while a power factor is corrected, and the first switching circuit acts as a rectifier circuit. Therefore, a voltage is supplied to at least one of the first switching circuit and the rectifier circuit based on the inputted AC input voltage, so that a DC voltage is supplied to at least one of the first DC power supply and the second DC power supply. Accordingly, even if the DC input voltage is not supplied from the first DC power supply, charge operation to the second DC power supply can be performed. In the case of charging the DC power supplies, when the first DC power supply is preferentially charged, control is performed such that a duty ratio is fixed in switching operation of the second switching circuit, and a duty ratio is variable in switching operation of the first switching circuit. On the other hand, when the second DC power supply is preferentially charged, control is performed such that at least one of the duty ratio in switching operation of the second switching circuit and the duty ratio of the switching element is variable depending on amount of charge of the second DC power supply, and the first switching circuit performs switching operation.

In the switching power supply unit of an embodiment of the invention, preferably, the switching control section performs control such that the first switching circuit performs switching operation with a switching duty ratio smaller than that of the second switching circuit. In the case of such a configuration, power loss during switching operation is reduced in the first switching circuit.

In the switching power supply unit of an embodiment of the invention, the switching power supply unit has first detection sections detecting amount of charge of at least one of the first and second DC power supplies, and the switching control section can perform control of preferential charge operation to one of the first and second DC power supplies based on a detection result given by the first detection sections. In the case of such a configuration, preferential charge operation can be performed to one of the first and second DC power supplies in consideration of amount of charge of each of the DC power supplies.

In the switching power supply unit of an embodiment of the invention, the switching power supply unit has a second detection section detecting presence of supply of an AC input voltage from the AC voltage input terminals, and the switching control section may perform control, based on a detection result given by the second detection section, such that when the AC input voltage is not supplied, a DC input voltage supplied from the first DC power supply is subjected to voltage conversion and then supplied to the second DC power supply, and when the AC input voltage is supplied, at least one of the first and second DC power supplies is subjected to charge operation. In the case of such a configuration, switching control can be performed between the DC voltage conversion operation and the charge operation to the second DC power supply in consideration of presence of supply of the AC input voltage.

According to the first switching power supply unit of an embodiment of the invention, when the first DC power supply is preferentially charged, control is performed such that a duty ratio is fixed in switching operation of the second switching circuit, and a duty ratio is variable in switching operation of the first switching circuit, and on the other hand, when the second DC power supply is preferentially charged, control is performed such that the duty ratio is variable in switching operation of the second switching circuit, and the first switching circuit performs switching operation, therefore appropriate charge can be performed to the first and second DC power supplies based on an AC input voltage. Moreover, when a DC input voltage is supplied from the first DC power supply, and the first switching circuit is operated as an inverter circuit, DC voltage conversion operation is performed, in which the DC input voltage is subjected to voltage conversion and then supplied to the second DC power supply, therefore voltage conversion can be performed between the first DC power supply and the second DC power supply. Accordingly, voltage conversion can be performed between the two DC power supplies, and appropriate charge can be performed to the DC power supplies based on the inputted AC voltage.

According to the second switching power supply unit of an embodiment of the invention, when the first DC power supply is preferentially charged, control is performed such that a duty ratio is fixed in switching operation of the second switching circuit, and a duty ratio is variable in switching operation of the first switching circuit, and on the other hand, when the second DC power supply is preferentially charged, control is performed such that at least one of the duty ratio in switching operation of the second switching circuit and the duty ratio of the switching element is variable depending on amount of charge of the second DC power supply, and the first switching circuit performs switching operation, therefore appropriate charge can be performed to the first and second DC power supplies based on the AC input voltage. Moreover, when a DC input voltage is supplied from the first DC power supply, and the first switching circuit is operated as an inverter circuit, DC voltage conversion operation is performed, in which a DC input voltage is subjected to voltage conversion and then supplied to the second DC power supply, therefore voltage conversion can be performed between the first DC power supply and the second DC power supply. Accordingly, power conversion can be performed between the two DC power supplies, and appropriate charge can be performed to the DC power supplies based on the inputted AC voltage.

Other and further objects, features and advantages of the invention will appear more fully from the following description.

DETAILED DESCRIPTION OF THE PREFERRED EMBODIMENTS

Hereinafter, the best mode for carrying out an embodiment of the invention (hereinafter, simply called embodiment) will be described in detail with reference to drawings.

First Embodiment

Figure 1:
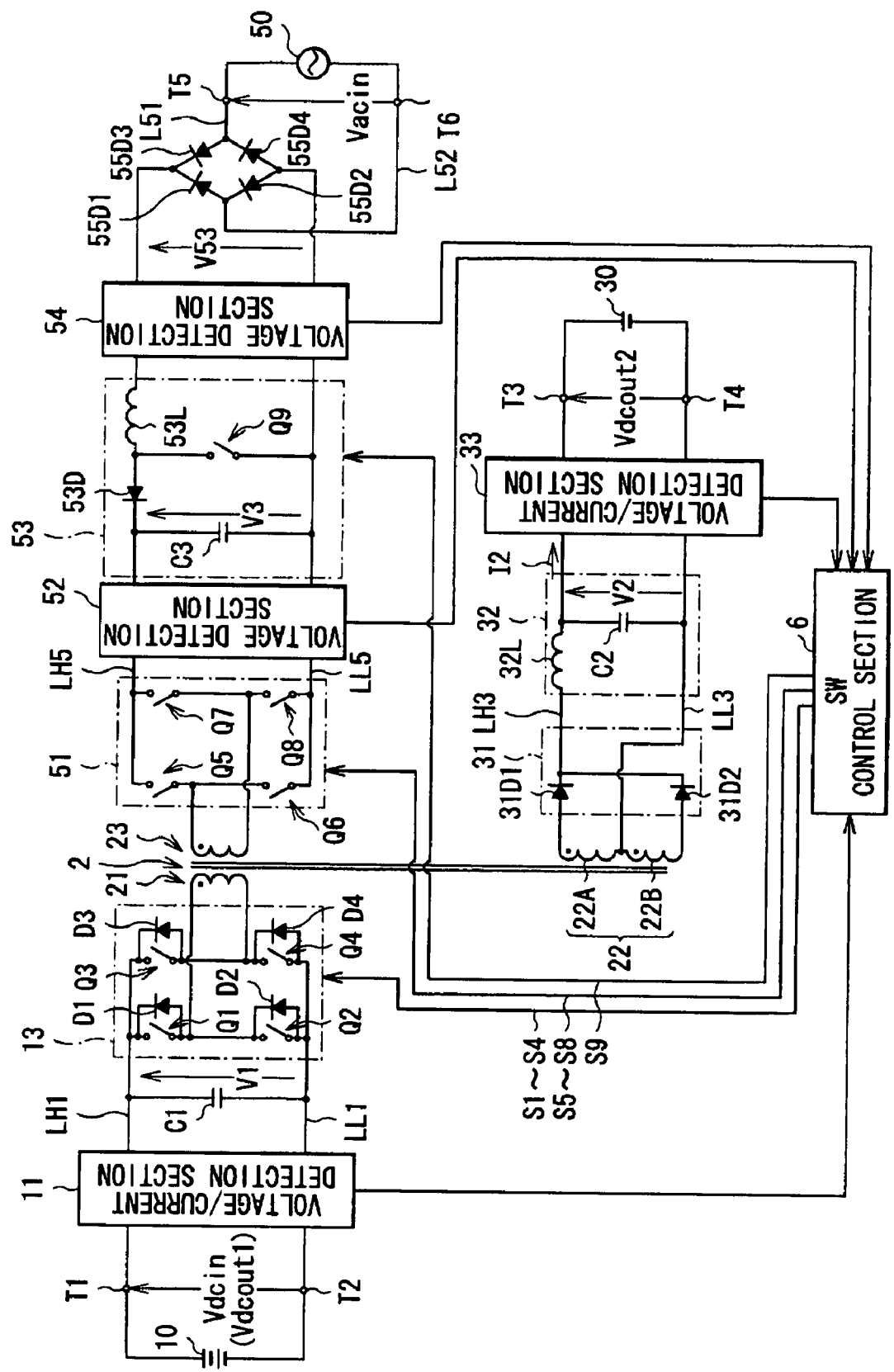
FIG. 1 is a circuit diagram showing a configuration of a switching power supply unit according to a first embodiment of the invention.

FIG. 1 shows a circuit configuration of a switching power supply unit according to a first embodiment of the invention. The switching power supply unit is applied to a car and the like, and has a transformer 2, a voltage/current detection section 11, a capacitor C1, and a bidirectional switching circuit 13, those being provided at a side of a main battery 10 described later with respect to the transformer 2, and a rectifier circuit 31, a smoothing circuit 32, a voltage/current detection section 33, a switching circuit 51, voltage detection sections 52 and 54, a PFC (Power Factor Correction) circuit 53, and diodes 55D1 to 55D4, and a SW control section 6 for controlling switching operation by the bidirectional switching circuit 13, switching circuit 51, and PFC circuit 53, those being provided at respective sides of an accessory battery 30 and a commercial power supply 50 described later with respect to the transformer 2.

The capacitor C1 is disposed between a high voltage line LH1 and a low voltage line LL1, and acts as a smoothing capacitor. One end of the high voltage line LH1 is connected to an input/output terminal T1 via the voltage/current detection section 11, one end of the low voltage line LL1 is connected to an input/output terminal T2 via the voltage/current detection section 11, and a main battery 10 is disposed between the input/output terminals T1 and T2. The main battery 10 supplies a DC input voltage Vdcin between the input/output terminals T1 and T2, and in charge operation described later, the battery 10 is subjected to charge operation based on a DC output voltage Vdcout1 between the input/output terminals T1 and T2. For example, when the switching power supply unit is applied to a car, the battery 10 is connected to an engine portion, and acts as a high voltage battery of, for example, about 350 to 500 V.

The voltage/current detection section 11 is insertionally disposed between the input/output terminals T1 and T2 and the capacitor C1, and detects a DC voltage V1 between both ends of the capacitor C1 and a current I1 (not shown) flowing through the high voltage line LH1, and outputs voltages corresponding to the detected DC voltage V1 and current I1 to the SW control section 6 respectively. As a specific circuit configuration of the voltage/current detection section 11, for example, the following circuit configurations are given: a circuit configuration where a voltage dividing resistance (not shown) disposed between the high voltage line LH1 and the low voltage line LL1 is used to detect the DC voltage V1, and generate a voltage corresponding to the voltage V1; and a circuit configuration where a resistance (not shown) insertionally disposed on the high voltage line LH1 is used to detect the current I1, and generate a voltage corresponding to the current I1.

The bidirectional switching circuit 13 is a switching circuit in a full-bridge type having four switching elements Q1 to Q4, and diodes D1 to D4 each of which is connected in parallel in a reverse direction between both ends of each of the switching elements Q1 to Q4 (a cathode of each diode is connected to a side of the high voltage line LH1, and an anode of each diode is connected to a side of the low voltage line LL1). Specifically, one end of the switching element Q1 is connected to the high voltage line LH1, and the other end is connected to one end of the switching element Q2 and one end of a winding 21 of the transformer 2 described later. One end of the switching element Q3 is connected to the high voltage line LH1, and the other end thereof is connected to one end of the switching element Q4 and the other end of the winding 21 of the transformer 2. The other end of the switching element Q2 and the other end of the switching element Q4 are connected to the low voltage line LL1 respectively. According to such a configuration, one switching element and one diode are used to configure one bidirectional switch, and while described later in detail, the bidirectional switching circuit 13 acts as an inverter circuit or a rectifier circuit. Each of the switching elements Q1 to Q4 of is configured by, for example, a bipolar transistor, IGBT (Insulated Gate Bipolar Transistor), or MOS-FET (Metal Oxide Semiconductor-Field Effect Transistor). When the switching elements Q1 to Q4 are configured by MOS-FET and have a parasitic diode component respectively, the parasitic diode component may be used in place of the diodes D1 to D4.

The transformer 2 has a winding 21 provided at the main battery 10 side, windings 22 (including a pair of windings 22A and 22B) provided at the accessory battery 30 side, and a winding 23 provided at the side of the commercial power supply 50 described later, and respective windings 21 to 23 are magnetically coupled so as to have polarities equal to one another. The winding 21 is disposed between the other end of the switching element Q1 and one end of the switching element Q4. On the other hand, both ends of each of the windings 22A and 22B are connected to the rectifier circuit 31, and both ends of the winding 23 are connected to the switching circuit 51. Specifically, one end of the winding 22A is connected to an anode of a diode 31D1 in the rectifier circuit 31 described later, one end of the winding 22B is connected to an anode of a diode 31D2 in the rectifier circuit 31 described later, and the other ends of the windings 22A and 22B are commonly connected to each other, and connected to a low voltage line LL3. Detail of connection and arrangement of the winding 23 is described later.

The rectifier circuit 31 has two diodes 31D1 and 31D2. Cathodes of the diodes 31D1 and 31D2 are connected to a high voltage line LH3 commonly to each other. That is, the rectifier circuit 31 is in a cathode common type.

The smoothing circuit 32 has an inductor 32L and a capacitor C2. The inductor 32L is insertionally disposed on the high voltage line LH3, and connected to the cathodes of the diodes 31D1 and 31D2 at one end, and connected to the output terminal T3 via the voltage/current detection section 33 at the other end. The capacitor C2 is disposed between the high voltage line LH3 (a portion near the other end of the inductor 32L) and the low voltage line LL3, and the other end of the low voltage line LL3 is connected to the output terminal T4 via the voltage/current detection section 33. The accessory battery 30 for driving not-shown accessories (for example, power window) is connected between the output terminals T3 and T4 to supply a DC output voltage Vdcout2 (for example, about 14 V).

The voltage/current detection section 33 is insertionally disposed between the output terminals T3, T4 and the capacitor C2, and detects a DC voltage V2 between both ends of the capacitor C2 and a current I2 flowing through the high voltage line LH3, and outputs voltages corresponding to the detected DC voltage V2 and current I2 to the SW control section 6 respectively. As a specific circuit configuration of the voltage/current detection section 33, for example, the following circuit configurations are given: a circuit configuration where a voltage dividing resistance (not shown) disposed between the high voltage line LH3 and the low voltage line LL3 is used to detect the DC voltage V2, and generate a voltage corresponding to the voltage V2; and a circuit configuration where a resistance (not shown) insertionally disposed on the high voltage line LH3 is used to detect the current I2, and generate a voltage corresponding to the current I2.

The diodes 55D1 to 55D4 are disposed between input terminals T5, T6 and the PFC circuit 53, and configure a bridge circuit. Specifically, an anode of the diode 55D1 and a cathode of the diode 55D2 are commonly connected to the input terminal T6 via a connection line L52, and an anode of the diode 55D3 and a cathode of the diode 55D4 are commonly connected to the input terminal T5 via a connection line L51. A cathode of the diode 55D1 and a cathode of the diode 55D3 are commonly connected to one end of a high voltage line LH5 (one end of an inductor 53L in the PFC circuit 53 described later), and an anode of the diode 55D2 and an anode of the diode 55D4 are commonly connected to one end of a low voltage line LL5. The commercial power supply 50 is connected between the input terminals T5 and T6 so that an AC input voltage Vacin (so-called commercial voltage) is inputted.

The voltage detection section 54 detects a DC voltage V53 given by rectifying an AC output voltage Vacout by the diodes 55D1 to 55D4, the voltage Vacout being supplied between the output terminals T5 and T6, and outputs a voltage corresponding to the DC voltage V53 to the SW control circuit 6. As a specific circuit configuration of the voltage detection section 54, for example, a circuit configuration is given, in which a voltage dividing resistance (not shown) disposed between the connection lines LH5 and LL5 is used to detect the DC voltage V53, and generate a voltage corresponding to the DC voltage V53.

The PFC circuit 53 has an inductor 53L, a diode 53D, a switching element Q9, and a capacitor C3. The other end of the inductor 53L is connected to an anode of the diode 53D and one end of the switching element Q9, the other end of the switching element Q9 is connected to the low voltage line LL5, and the capacitor C3 is disposed between the high voltage line LH5 (in an area between the diode 53D and a voltage detection section 52 described later) and the low voltage line LL5 (in an area between the other end of the switching element Q9 and the voltage detection section 52). The switching element Q9 is configured by, for example, a bipolar transistor, IGBT or MOS-FET. According to such a configuration, while described later in detail, the PFC circuit 53 steps up and stabilizes an input voltage V53 into the PFC circuit 53 so as to correct a power factor. While the PFC circuit may be configured by only the capacitor C3, when a PFC circuit is configured as the PFC circuit 53 in the embodiment, since switching operation of the switching element Q9 can be performed in all bands of input frequency, a peak current is decreased, consequently a ripple voltage is preferably reduced compared with a smoothing capacitor having the same capacitance.

The voltage detection section 52 detects a voltage V3 between both ends of the capacitor C3, and outputs a voltage corresponding to the detected voltage V3 to the SW control circuit 6. As a specific circuit configuration of the voltage detection section 52, similarly as the voltage detection section 54, a circuit configuration or the like is given, in which a voltage dividing resistance (not shown) disposed between the connection lines LH5 and LL5 is used to detect the voltage V3 and generate a voltage corresponding to the voltage V3.

The switching circuit 51 is a switching circuit in a full-bridge type having four switching elements Q5 to Q8. Specifically, one end of the switching element Q5 is connected to the high voltage line LH5, and the other end thereof is connected to one end of the switching element Q6 and one end of the winding 23 of the transformer 2. One end of the switching element Q7 is connected to the high voltage line LH5, and the other end is connected to one end of the switching element Q8 and the other end of the winding 23 of the transformer 2. The other end of the switching element Q6 and the other end of the switching element Q8 are connected to the low voltage line LL5 respectively. The switching elements Q5 to Q8 are configured by, for example, the bipolar transistor, IGBT, or MOS-FET.

The SW control section 6 generates and outputs switching control signals S1 to S9 based on the DC voltage V1 and the current I1 detected by the voltage/current detection section 11, the DC voltage V2 and the current I2 detected by the voltage/current detection section 33, the DC voltage V53 detected by the voltage detection section 54, and the DC voltage V3 detected by the voltage detection section 52, and controls switching operation of the switching elements Q1 to Q4 in the bidirectional switching circuit 13, the switching elements Q5 to Q8 in the switching circuit 51, and the switching element Q9 in the PFC circuit 53, respectively.

Here, the winding 21 corresponds to a specific example of a "first transformer coil" in an embodiment of the invention, the windings 22 (22A and 22B) correspond to a specific example of a "second transformer coil" in an embodiment of the invention, and the winding 23 corresponds to a specific example of a "third transformer coil" in an embodiment of the invention. Moreover, the main battery 10 corresponds to a specific example of a "first DC power supply" in an embodiment of the invention, and the accessory battery 30 corresponds to a specific example of a "second DC power supply" in an embodiment of the invention. Moreover, the bidirectional switching circuit 13 corresponds to a specific example of a "first switching circuit" in an embodiment of the invention, the switching circuit 51 corresponds to a specific example of a "second switching circuit" in an embodiment of the invention. Input terminals T5 and T6 correspond to a specific example of "AC voltage input terminals" in an embodiment of the invention, and the switching element Q9 corresponds to a specific example of a "switching element" in an embodiment of the invention. The voltage/current detection sections 11 and 33 correspond to a specific example of "first detection sections" in an embodiment of the invention, and the voltage detection section 54 corresponds to a specific example of a "second detection section" in an embodiment of the invention.

Next, operation of the switching power supply unit having a configuration as above is described in detail.

Figure 2:
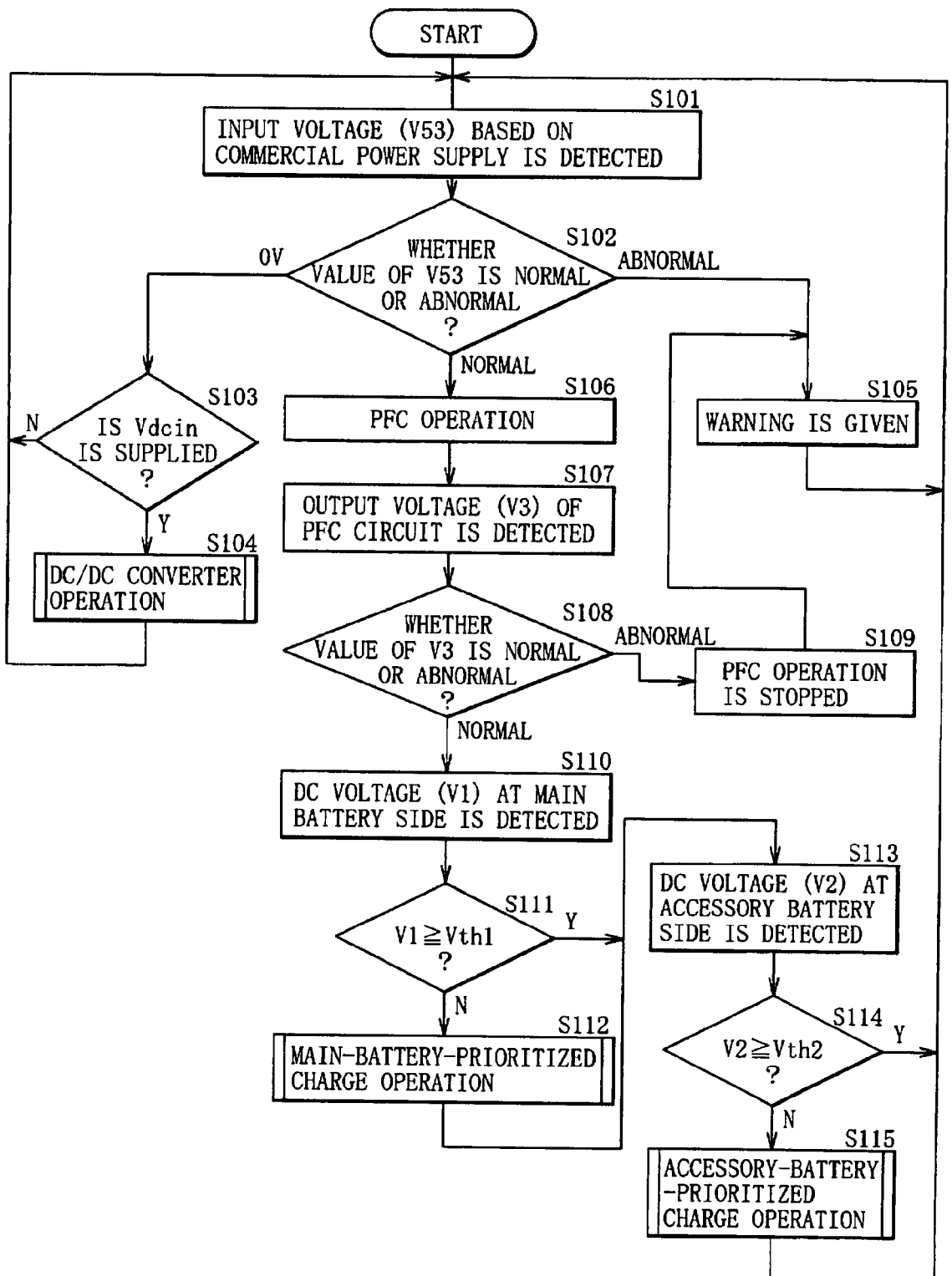
FIG. 2 is a flowchart showing an example of control operation by an SW control section shown in FIG. 1.

First, general operation of the switching power supply unit is described with reference to FIGS. 1 and 2. Here, FIG. 2 shows in a flowchart an example of control operation to the switching power supply unit by the SW control section 6 in the switching power supply unit of the embodiment.

First, when the voltage detection section 54 detects the DC voltage V53 (input voltage based on the commercial power supply 50) (step S101), the SW control section 6 evaluates a value of the DC voltage V53 (step S102). When the value of V53 is 0 V (step S102: 0V), the SW control section 6 then determines whether the DC input voltage Vdcin is supplied or not based on the DC voltage V1 detected by the voltage/current detection section 11 (step S103). When the SW control section 6 determines the voltage Vdcin is not supplied (step S103: N), operation is returned to the step S101, and when it determines the voltage Vdcin is supplied (step S103: Y), DC/DC converter operation is performed, so that the DC input voltage Vdcin supplied from the main battery 10 is subjected to DC voltage conversion, thereby the voltage Vdcin is converted into the DC output voltage Vdcout2 and then supplied to the accessory battery 30 (step S104). For example, when the switching power supply unit of the embodiment is applied to a car, the DC/DC converter operation corresponds to operation in the case that power is supplied from an engine to the main battery 10, and therefore the accessory battery 30 drives accessories, that is, corresponds to operation during engine operation (during car running). After the DC/DC converter operation is finished, operation is returned to the step S101. Detail of the DC/DC converter operation is described later (refer to FIGS. 3 and 4).

On the other hand, in the step S102, when the DC voltage V53 is supplied, and a value of the voltage V53 is abnormal (for example, more than a predetermined threshold voltage) (step S102: abnormal), the SW control section 6 gives a warning to a user (for example, indication using sound or a message) to alert the user (step S105). After the step S105, operation is returned to the step S101.

In the step S102, when the DC voltage V53 is supplied, and a value of the voltage V53 is normal (for example, less than the predetermined threshold voltage, but not 0 V) (step S102: normal), the SW control section 6 outputs a switching control signal S9 such that the switching element Q9 in the PFC circuit 53 performs switching operation to allow the PFC circuit 53 to perform predetermined PFC operation (step S106). Detail of the PFC operation is described later (refer to FIG. 7).

Next, when the voltage detection section 52 detects the DC voltage between both the ends of the capacitor C3 (output voltage of the PFC circuit 53) V3 (step S107), the SW control section 6 evaluates a value of the DC voltage V3 (step S108). When a value of the DC voltage V3 is abnormal (for example, more than a predetermined threshold voltage, or 0V) (step S108: abnormal), the SW control section 6 stops switching operation of the switching element Q9 using a switching control signal S9, in addition, stops PFC operation of the PFC circuit 53 (step S109). Then, the SW control section 6 gives a warning to the user (step S105), and operation is returned to the step S101.

On the other hand, in the step S108, in the case that a value of the DC voltage V3 is normal (for example, less than the predetermined threshold voltage, but not 0 V) (step S108: normal), when the voltage/current detection section 11 then detects the DC voltage V1 between both the ends of the capacitor C1 (step S110), the SW control section 6 determines whether a value of the DC voltage V1 is at least a predetermined threshold voltage Vth1, thereby it estimates amount of charge of the main battery 10 (step S111). When the SW control section 6 determines the value of the DC voltage V1 is at least the threshold voltage Vth1 (the amount of charge of the main battery 10 is at least a predetermined threshold value) (step S111: Y), operation is advanced to a subsequent step S113. On the other hand, when the SW control section 6 determines the value of the DC voltage V1 is less than the threshold voltage Vth1 (the amount of charge of the main battery 10 is less than a predetermined threshold value) (step S111: N), main-battery-prioritized charge operation is performed, that is, the main battery 10 is preferentially (the main battery 10 is mainly) subjected to charge operation using the DC voltage V3 based on the commercial voltage (AC input voltage Vacin) supplied from the commercial power supply 50 (step S112). After the main-battery-prioritized charge operation, operation is advanced to the step S113. Detail of the main-battery-prioritized charge operation is described later (FIGS. 5 to 8).

Figure 9:
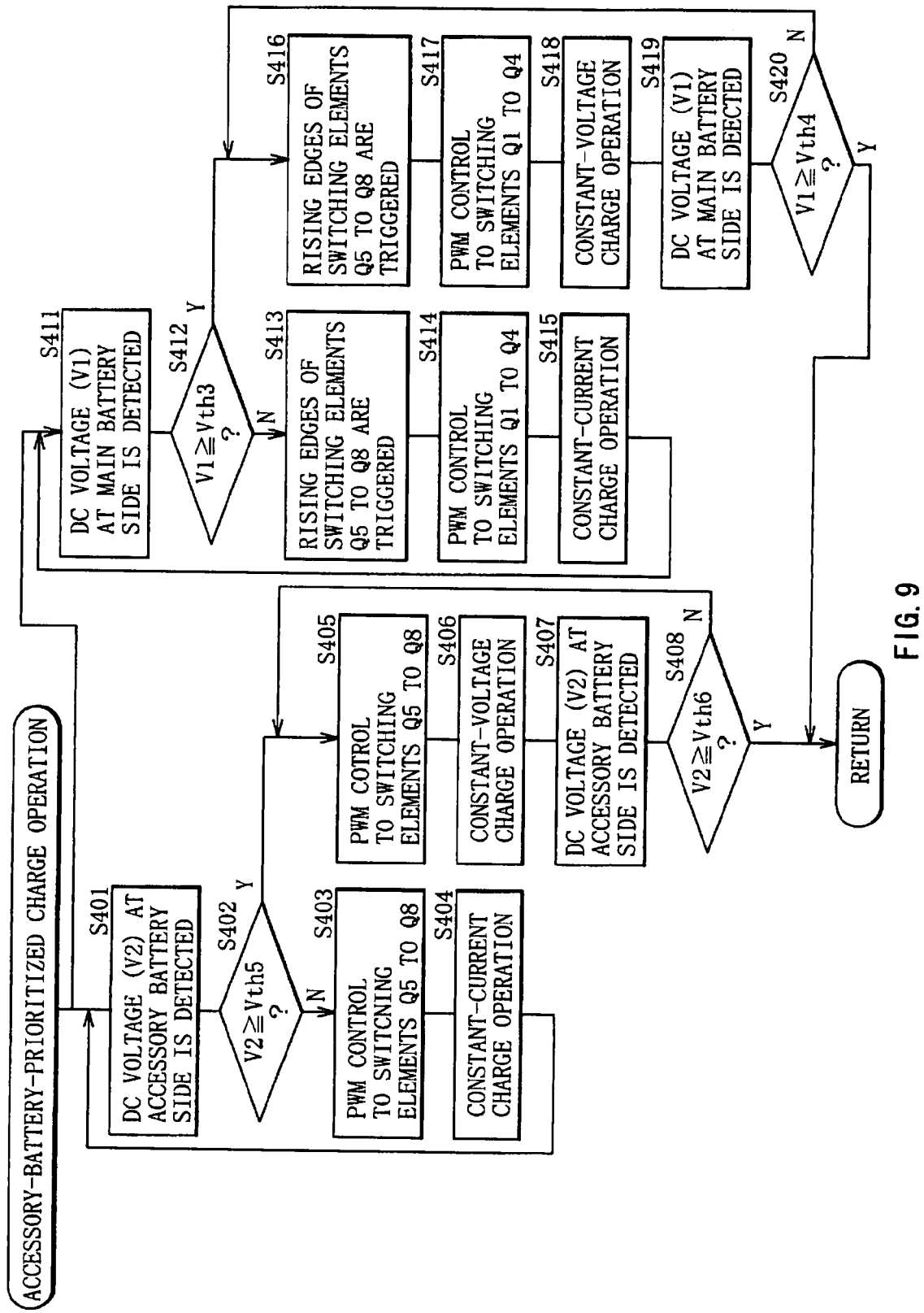
FIG. 9 is a flowchart showing a detailed example of accessory-battery-prioritized charge operation according to the first embodiment.
Figure 10:
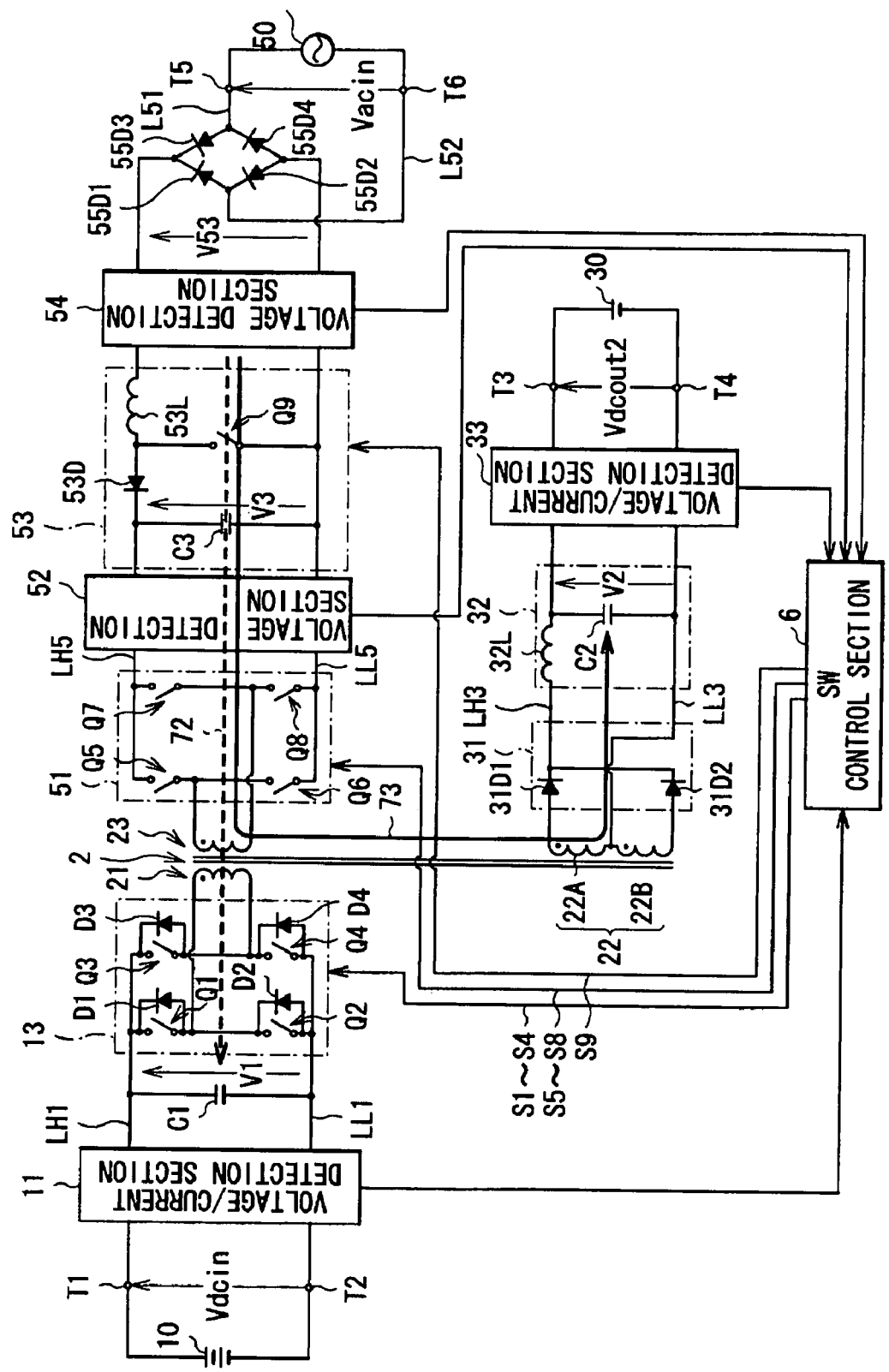
FIG. 10 is a circuit diagram for explaining an energy transfer path in the accessory-battery-prioritized charge operation shown in FIG. 2.
Figure 11:
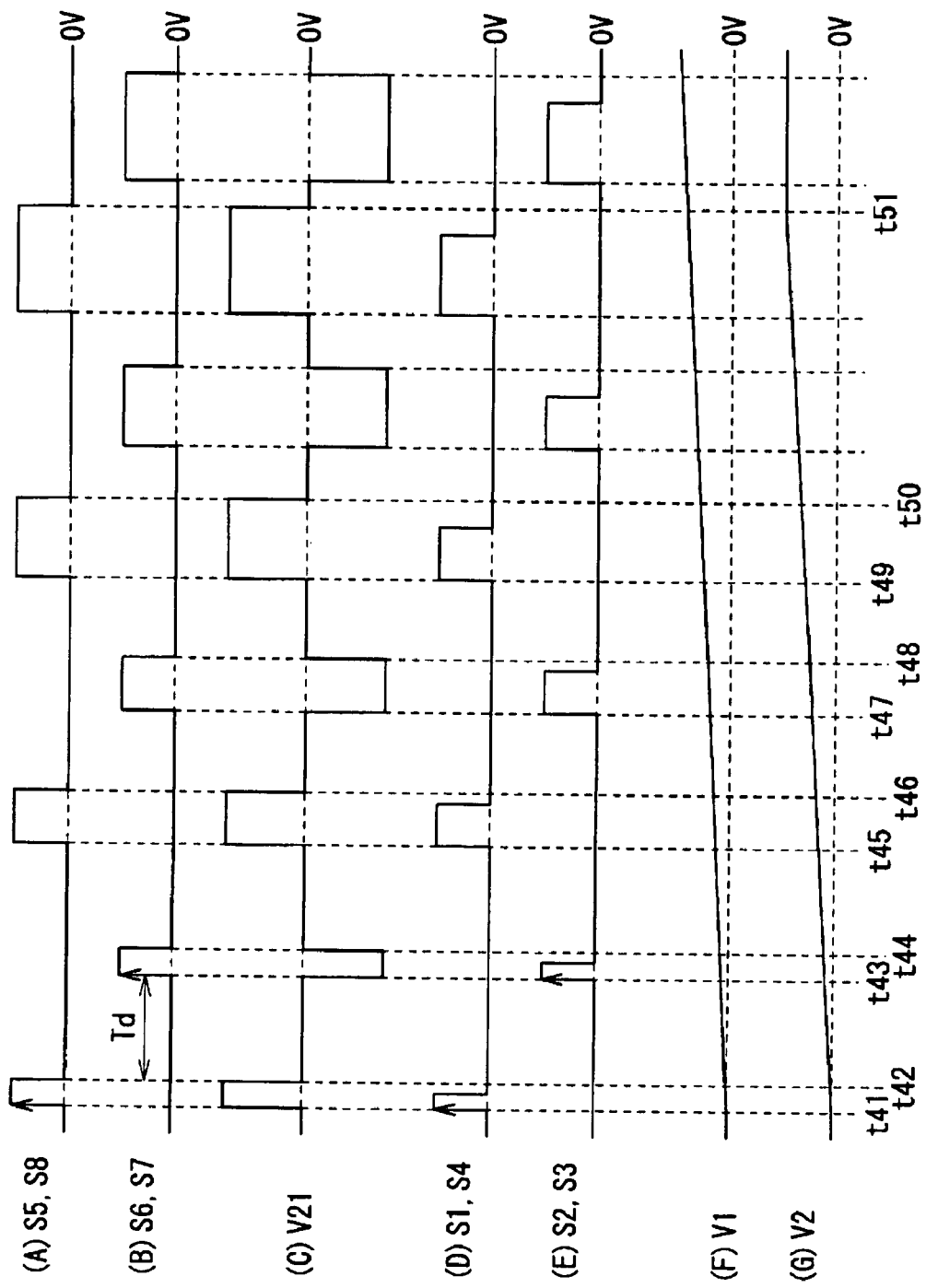
FIGS. 11A to 11G are timing waveform diagrams for explaining the accessory-battery-prioritized charge operation according to the first embodiment.

Then, when the voltage/current detection section 33 detects the DC voltage V2 between both the ends of the capacitor C2 (step S113), the SW control section 6 determines whether a value of the DC voltage V2 is at least a predetermined threshold voltage Vth2, thereby it estimates amount of charge of the accessory battery 30 (step S114). When the SW control section 6 determines the value of the DC voltage V2 is at least the threshold voltage Vth2 (the amount of charge of the accessory battery 30 is at least a predetermined threshold value) (step S114: Y), operation is returned to the first step S101. On the other hand, when the SW control section 6 determines the value of the DC voltage V2 is less than the threshold voltage Vth2 (the amount of charge of the accessory battery 30 is less than a predetermined threshold value) (step S114: N), accessory-battery-prioritized charge operation is performed, wherein the accessory battery 30 is preferentially (the accessory battery 30 is mainly) subjected to charge operation using the DC voltage V3 based on the commercial voltage (AC input voltage Vacin) supplied from the commercial power supply 50 (step S115). After the accessory-battery-prioritized charge operation, operation is returned to the first step S101. Detail of the accessory-battery-prioritized charge operation is described later (FIGS. 9 to 11).

Here, when the switching power supply of the embodiment is applied to, for example, a car, each of the main-battery-prioritized charge operation and the accessory-battery-prioritized charge operation corresponds to operation in the case that since an engine is stopped, at least one of the main battery 10 and the accessory battery 30 is charged by inputting the AC input voltage Vacin from an external commercial power supply 50, that is, corresponds to operation during engine stop.

In the control operation of the switching power supply unit as shown in FIG. 2, for example, a user issues an instruction to stop operation of the power supply unit as a whole, so that the control operation is finished.

Next, the DC/DC converter operation, main-battery-prioritized charge operation, and accessory-battery-prioritized charge operation as shown in FIG. 2 are described in detail with reference to FIGS. 3 to 11 respectively.

Figure 3:
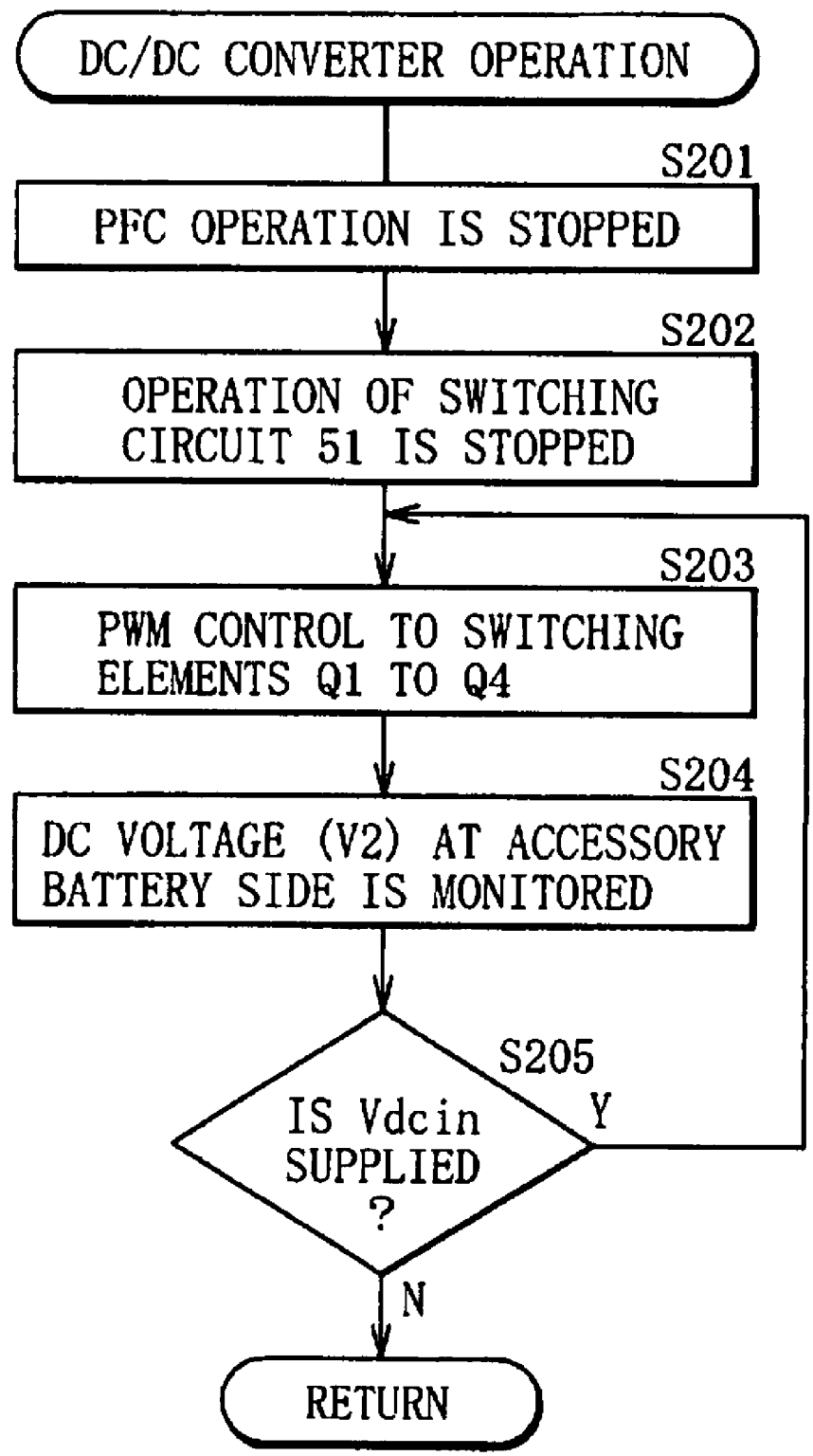
FIG. 3 is a flowchart showing a detailed example of DC/DC converter operation shown in FIG. 2.
Figure 4:
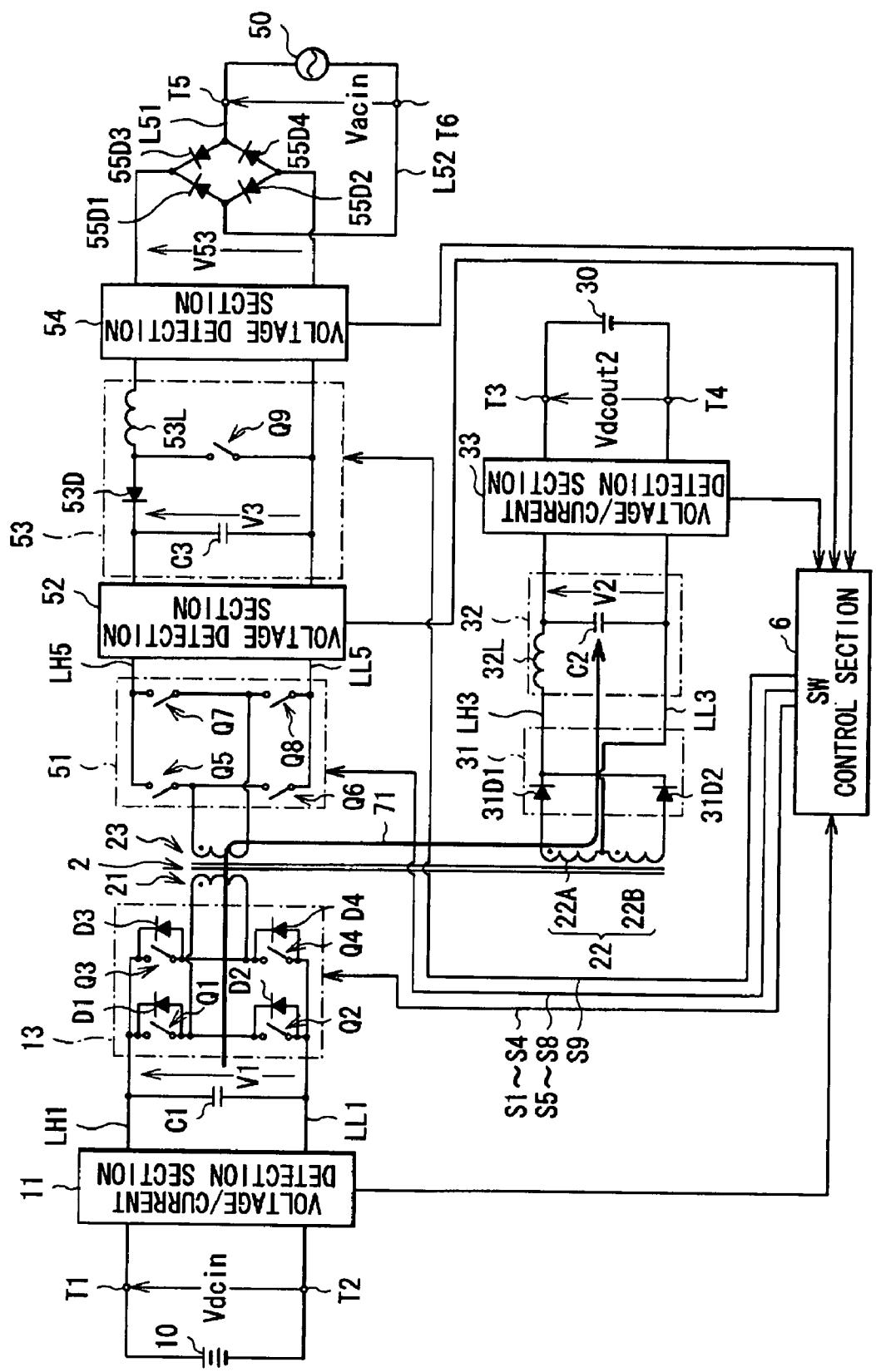
FIG. 4 is a circuit diagram for explaining an energy transfer path in the DC/DC converter operation shown in FIG. 2.
Figure 5:
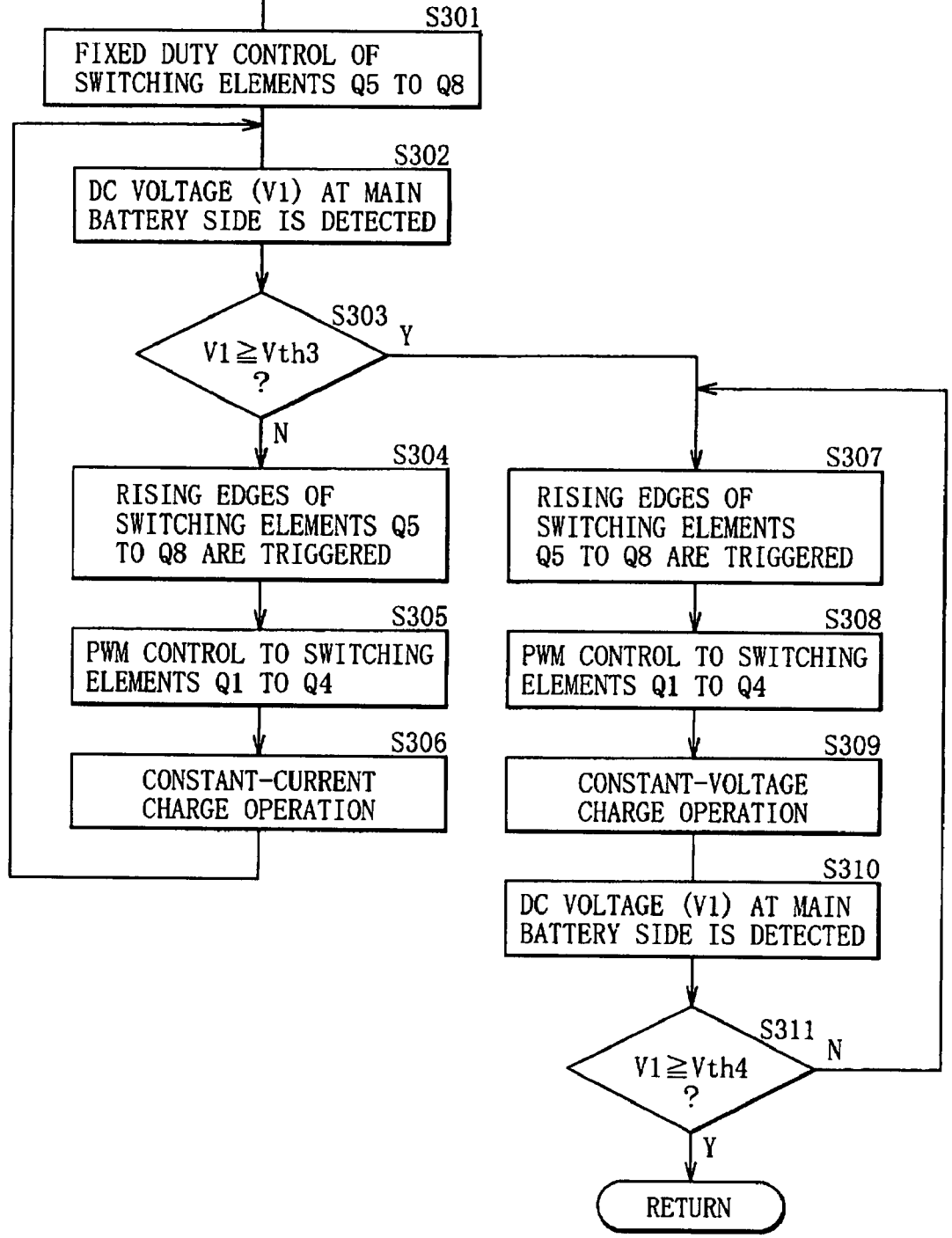
FIG. 5 is a flowchart showing a detailed example of main-battery-prioritized charge operation shown in FIG. 2.
Figure 6:
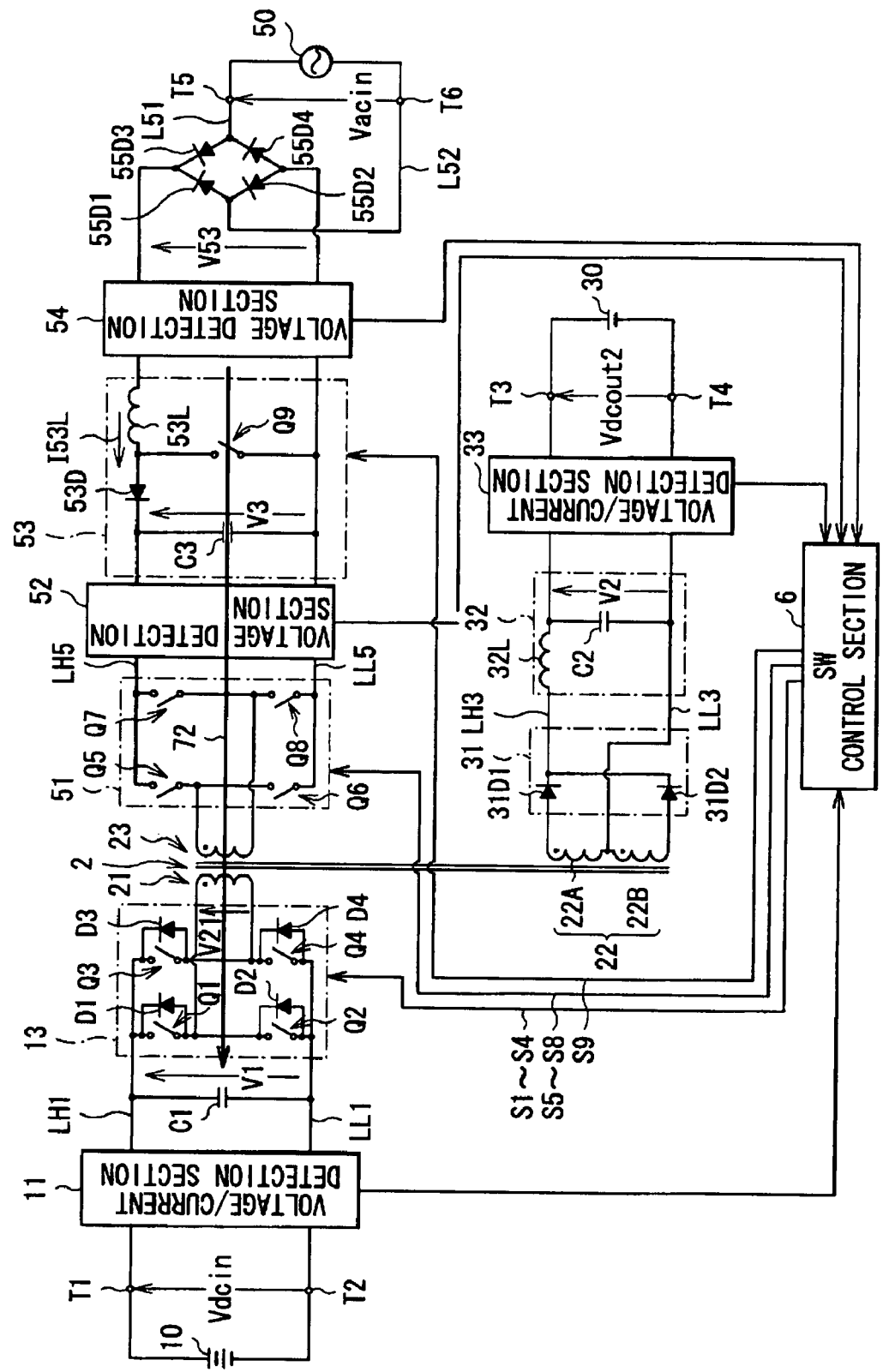
FIG. 6 is a circuit diagram for explaining an energy transfer path in the main-battery-prioritized charge operation shown in FIG. 2.
Figure 7:
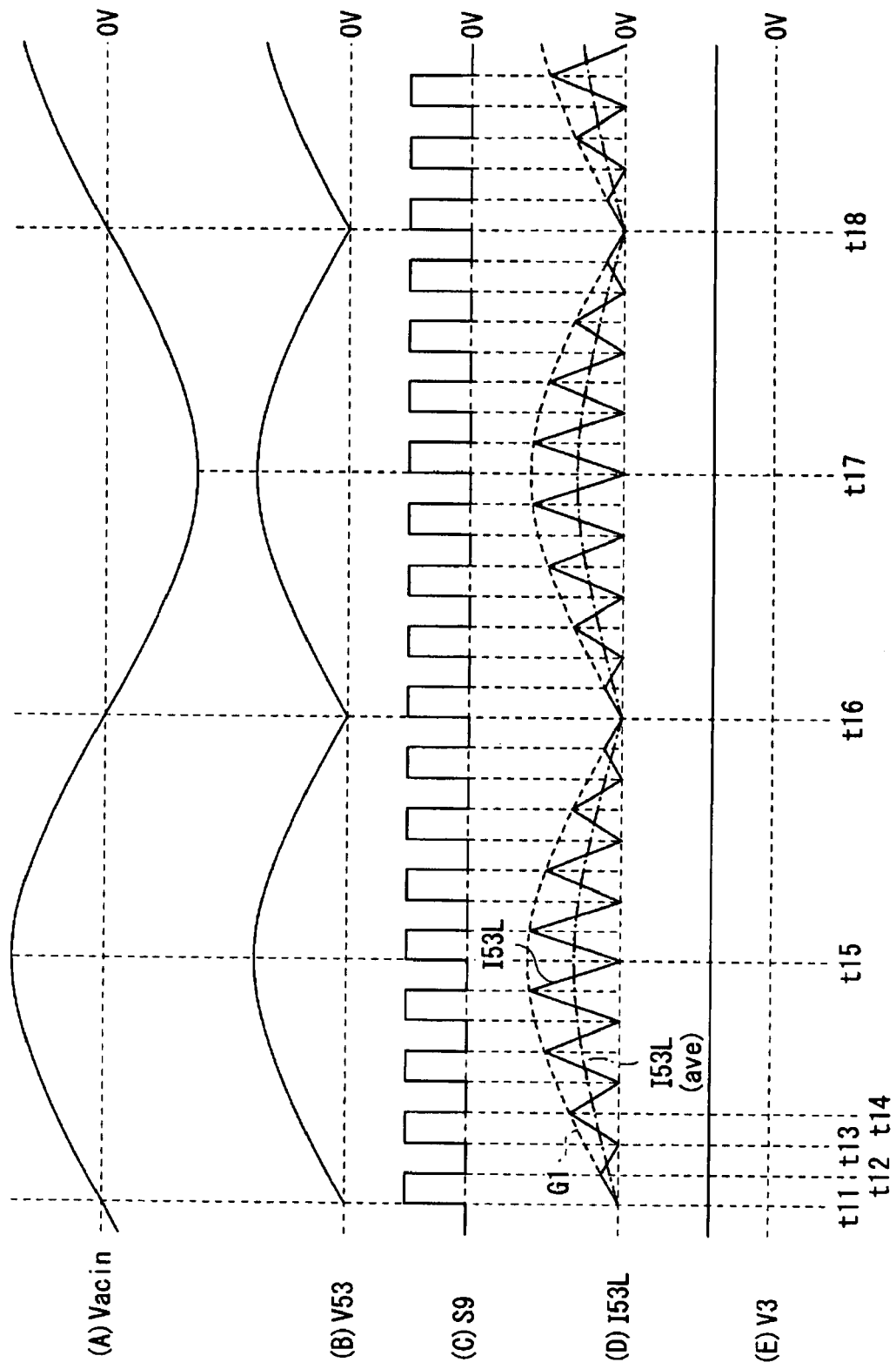
FIGS. 7A to 7E are timing waveform diagrams for explaining conversion operation from an AC input voltage into a DC voltage in the switching power supply unit of FIG. 1.
Figure 8:
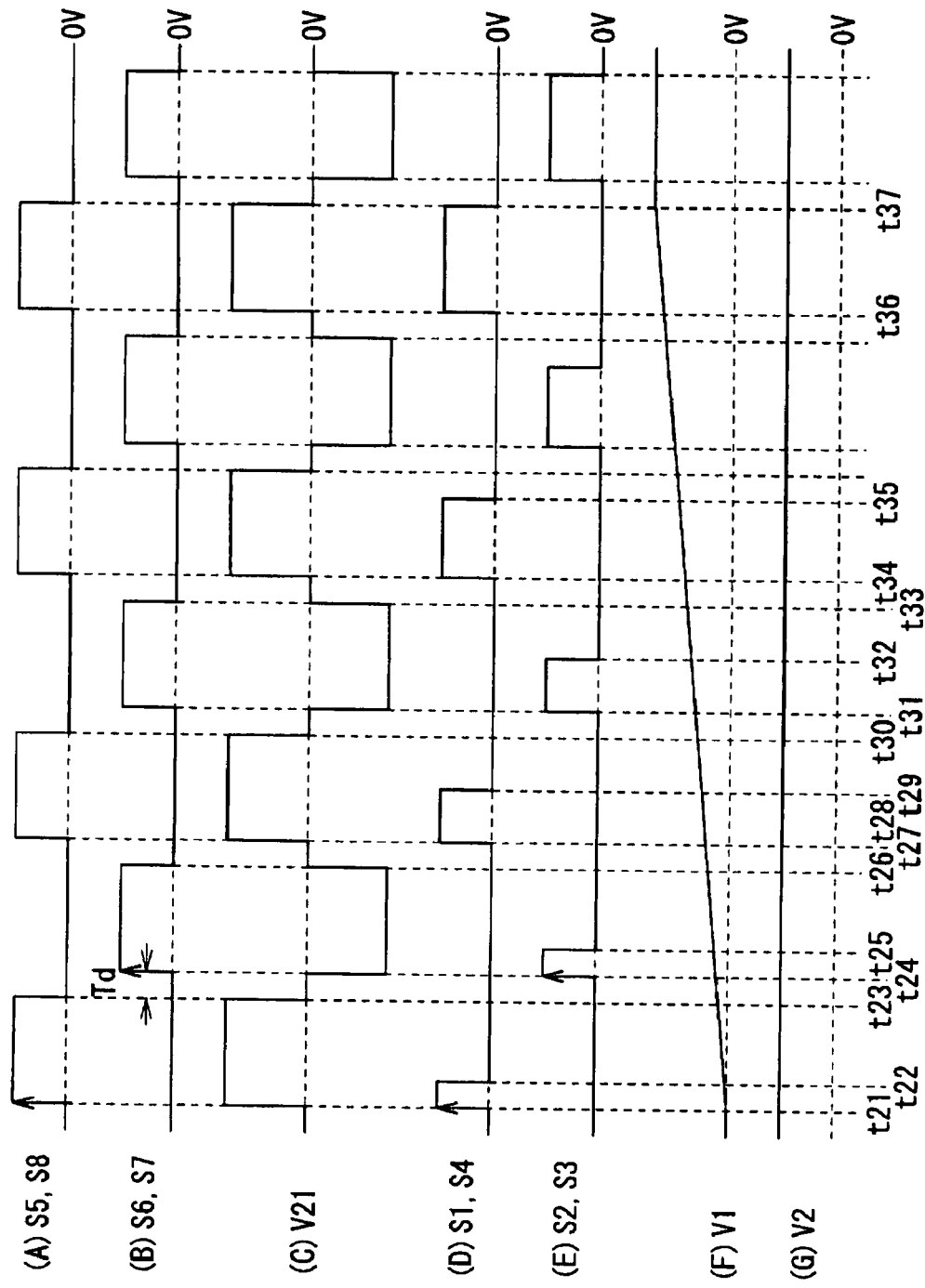
FIGS. 8A to 8G are timing waveform diagrams for explaining the main-battery-prioritized charge operation shown in FIG. 2.

Here, FIG. 3 shows in a flowchart detail of the DC/DC converter operation (step S104 shown in FIG. 2), and FIG. 4 shows in a circuit diagram an energy transfer path in the DC/DC converter operation. FIG. 5 shows in a flowchart detail of the main-battery-prioritized charge operation (step S112 shown in FIG. 2), and FIG. 6 shows in a circuit diagram an energy transfer path in the main-battery-prioritized charge operation, and FIGS. 7 and 8 show in timing waveform diagrams operation of respective circuits in the main-battery-prioritized charge operation. FIG. 9 shows in a flowchart detail of the accessory-battery-prioritized charge operation (step S115 shown in FIG. 2), FIG. 10 shows in a circuit diagram an energy transfer path in the accessory-battery-prioritized charge operation, and FIG. 11 shows in a timing waveform diagram operation of respective circuits in the accessory-battery-prioritized charge operation.

First, detail of the DC/DC converter operation is described with reference to FIGS. 3 and 4.

In the DC/DC converter operation, first, the SW control section 6 stops switching operation of each of the switching elements Q5 to Q9 using the switching control signals S5 to S9, thereby PFC operation by the PFC circuit 53 and switching operation by the switching circuit 51 are stopped (steps S201 and S202) so that a voltage based on the AC input voltage Vacin from the commercial power supply 50 is not supplied to the winding 23 of the transformer 2.

Next, the SW control section 6 performs PWM (Pulse Width Modulation) control to the switching elements Q1 to Q4 in the bidirectional switching circuit 13 using the switching control signals S1 to S4, so that the DC input voltage Vdcin supplied from the main battery 10 is subjected to DC voltage conversion, thereby the voltage Vdcin is converted into a DC output voltage Vdcout2 and then supplied to the accessory battery 30 (step S203).

Specifically, to describe with reference to FIG. 4, first, when the DC input voltage Vdcin is inputted from the main battery 10 via the input/output terminals T1 and T2, the bidirectional switching circuit 13 acts as an inverter circuit, and switches the DC input voltage Vdcin so that an AC pulse voltage is generated, and then supplied to the winding 21 of the transformer 2. Then, a transformed (here, stepped-down) AC pulse voltage is produced at the windings 22A and 22B of the transformer 2. In this case, a level of transformation is determined by a winding ratio of the winding 21 to the windings 22A and 22B.

Next, the transformed AC pulse voltage is rectified by the diodes 31D1 and 31D2 in the rectifier circuit 31. Thus, rectified output is generated between the high voltage line LH3 and the low voltage line LL3.

Next, the smoothing circuit 32 smoothes the rectified output generated between the high voltage line LH3 and the low voltage line LL3, and thus the DC output voltage Vdcout is outputted from the output terminals T3 and T4. The DC output voltage Vdcout is supplied to the accessory battery 30, and accordingly not-shown accessories are driven.

In this way, as shown by an energy transfer path 71 shown in FIG. 4, the DC input voltage Vdcin supplied from the main battery 10 is subjected to DC voltage conversion by the bidirectional switching circuit 13 acting as the DC/DC converter, windings 21, 22A and 22B of the transformer 2, rectifier circuit 31, and smoothing circuit 32, and thereby the voltage Vdcin is converted into the DC output voltage Vdcout and then outputted from the output terminals T3 and T4. Thus, the accessory battery 30 is subjected to constant voltage charge, and accordingly not-shown accessories are driven.

At that time, the switching elements Q1 to Q4 in the bidirectional switching circuit 13 are subjected to PWM control such that the DC output voltage Vdcout (DC voltage V2 between both ends of the capacitor C2) is continuously monitored by the voltage/current detection section 33 (step S204 in FIG. 3), and a voltage corresponding to the voltage Vdcout is outputted to the SW control section 6, thereby the DC output voltage Vdcout becomes constant.

Moreover, at that time, the DC input voltage Vdcin (DC voltage V1 between both ends of the capacitor C1) is also continuously monitored by the voltage/current detection section 11, and the SW control section 6 determines whether the DC input voltage Vdcin is supplied or not (step S205). When the SW control section 6 determines the DC input voltage Vdcin is supplied (step S205: Y), operation is returned to the step S203, and the switching elements Q1 to Q4 are continued to be subjected to PWM control. On the other hand, when the SW control section 6 determines the DC input voltage Vdcin is not supplied (step S205: N), the DC/DC converter operation is finished (return), and operation is returned to the first step S101 shown in FIG. 2.

Next, detail of the main-battery-prioritized charge operation is described with reference to FIGS. 5 and 8.

Here, FIGS. 7A to 7E show operation waveforms before generating the voltage V3 between both ends of the capacitor C3 based on the AC input voltage Vacin, wherein FIG. 7A shows the AC input voltage Vacin, FIG. 7B shows an input voltage into the PFC circuit 53 (output voltage from the bridge circuit using the diodes 55D1 to 55D4) V53, FIG. 7C shows a switching control signal S9, FIG. 7D shows a current I53L flowing through the inductor L53, and FIG. 7E shows the voltage V3 between both ends of the capacitor C3 respectively. FIGS. 8A to 8G show operation waveforms before the capacitor C1 is preferentially charged (main battery 10 is preferentially charged) based on the voltage V3, wherein FIG. 8A shows a switching control signal S5 or S8, FIG. 8B shows a switching control signal S6 or S7, FIG. 8C shows a voltage V21 generated between both ends of the winding 21 of the transformer 2, FIG. 8D shows a switching control signal S1 or S4, FIG. 8E shows a switching control signal S2 or S3, FIG. 8F shows the voltage V1 between both ends of the capacitor C1, and FIG. 8G shows the voltage V2 between both ends of the capacitor C2 respectively. Directions of arrows shown in FIG. 1 show positive directions of the AC input voltage Vacin, the voltages V53, V3, V21, V1, V2, and the current I53L respectively.

In the main-battery-prioritized charge operation, first, the SW control section 6 performs control using the switching control signals S5 to S8 such that each of the switching elements Q5 to Q8 in the switching circuit 51 performs switching operation with a fixed duty ratio (step S301). When the voltage/current detection section 11 detects the DC voltage V1 between both ends of the capacitor C1 (step S302), the SW control section 6 determines whether a value of the DC voltage V1 is at least a predetermined threshold voltage Vth3, thereby the SW control section 6 estimates amount of charge of the main battery 10 (step S303). When the SW control section 6 determines the value of the DC voltage V1 is at least the threshold voltage Vth3 (constant-current charge operation to the main battery 10 is completed) (step S303: Y), operation is advanced to a subsequent step S307.

On the other hand, in the step S303, when the SW control section 6 determines the value of the DC voltage V1 is less than the threshold voltage Vth3 (constant-current charge operation to the main battery 10 is not completed) (step S303: N), the SW control section 6 triggers rising edges of the switching elements Q5 to Q8 performing switching operation according to fixed duty control (step S304), thereby outputs switching control signals S1 to S4 while rising of the signals is synchronized with switching operation of the switching elements Q5 to Q8, and performs PWM control to the switching elements Q1 to Q4 (step S305). In this way, while the switching elements Q5 to Q8 are subjected to fixed duty control, the switching elements Q1 to Q4 are subjected to PWM control while being synchronized in rising with the switching elements Q5 to Q8, thereby the main battery 10 is preferentially subjected to constant-current charge operation (step S306). After the constant-current charge operation, operation is returned to the step S302.

On the other hand, in the step S303, when the SW control section 6 determines the value of the DC voltage V1 is at least the threshold voltage Vth3 (constant-current charge operation to the main battery 10 is completed) (step S303: Y), the SW control section 6 similarly triggers rising edges of the switching elements Q5 to Q8 (step S307), thereby outputs the switching control signals S1 to S4 while rising of the signals is synchronized with switching operation of the switching elements Q5 to Q8, and performs PWM control to the switching elements Q1 to Q4 (step S308). In this way, while the switching elements Q5 to Q8 are subjected to fixed duty control, the switching elements Q1 to Q4 are subjected to PWM control while being synchronized in rising with the switching elements Q5 to Q8, thereby the main battery 10 is preferentially subjected to constant-voltage charge operation (step S309). After the constant-voltage charge operation, the voltage/current detection section 11 detects the DC voltage V1 between both ends of the capacitor 1 (step S310), and the SW control section 6 determines whether a value of the DC voltage V1 is at least a predetermined threshold voltage Vth4, thereby the SW control section 6 estimates amount of charge of the main battery 10 (step S311). When the SW control section 6 determines the value of the DC voltage V1 is less than the threshold voltage Vth4 (constant-voltage charge operation to the main battery 10 is not completed) (step S311: N), operation is returned to the step S307. On the other hand, when the SW control section 6 determines the value of the DC voltage V1 is at least the threshold voltage Vth4 (constant-voltage charge operation to the main battery 10 is completed) (step S311: Y), the main-battery-prioritized charge operation is finished (return), and operation is advanced to the step S113 shown in FIG. 2.

Such preferential charge operation (constant-current charge operation and constant-voltage charge operation) to the main battery 10 is specifically described with reference to FIGS. 6 to 8 as follows.

First, as shown in FIG. 6, when the AC input voltage Vacin (commercial voltage) as shown in FIG. 7A is inputted from the commercial power supply 50 via the input terminals T5 and T6, the AC input voltage Vacin is rectified by the bridge circuit including the diodes 55D1 to 55D4, so that the DC voltage V53 as shown in FIG. 7B is generated, and then inputted into the PFC circuit 53. During this, the switching element Q9 repeats on/off operation as shown in FIG. 7C (for example, on state in periods of timing t11 to timing t12 and timing t13 to timing t14, and off state in a period of timing t12 to timing t13), as a result, the current I53L flowing through the inductor 53L shows a triangular waveform as shown in FIG. 7D, and as shown by a sign G1, a locus formed by peak voltages of the triangular wave shows a half-wave sinusoidal waveform with each of periods of timing t11 to timing t15, timing t15 to timing t16, timing t16 to timing t17, and timing t17 to timing t18, . . . as one cycle. A current I53L (ave) shown in FIG. 7D shows an average current of the current I53L. In this way, the voltage V3 between both ends of the capacitor C3 becomes a DC voltage having a constant value as shown in FIG. 7E due to operation of the PFC circuit 53.

Next, the main battery 10 is preferentially subjected to charge operation through the energy transfer path 72 as shown in FIG. 6 based on the voltage V3 stored between both ends of the capacitor C3. First, the switching circuit 51 acts as an inverter circuit, and the switching elements Q5 to Q8 perform on/off operation with a fixed duty ratio as shown in timing t21 to timing t28 and the like in FIGS. 8A and 8B, thereby an AC pulse voltage is generated at the winding 23 of the transformer 2. Then, a transformed AC pulse voltage V21 as shown in FIG. 8C is generated between both ends of the winding 21 depending on a winding ratio of the winding 23 to the winding 21.

Next, the bidirectional switching circuit 13 acts as a rectifier circuit, and the switching elements Q1 to Q4 perform on/off operation while being synchronized in rising with the switching elements Q5 to Q8 as shown in FIGS. 8D and 8E, thereby the AC pulse voltage V21 is rectified, consequently the DC voltage V1 is applied between both ends of the capacitor C1. In this way, as shown in FIG. 8F, the DC voltage V1 at a main battery 10 side is gradually increased, and charge operation to the main battery 10 is performed based on the DC voltage V1 (DC output voltage Vdcout1). Moreover, a duty ratio of each of the switching elements Q1 to Q4 performing PWM operation is adjusted, thereby amount of charge of the main battery 10 is adjusted.

On the other hand, for the accessory battery 30, when an AC pulse voltage is generated at the winding 23 of the transformer 2 as described before, a transformed AC pulse voltage determined by the winding ratio of the winding 23 to the windings 22A and 22B is similarly produced at the windings 22A and 22B of the transformer 2. The transformed AC pulse voltage is rectified by the rectifier circuit 31, and then smoothed by the smoothing circuit 32, thereby charge operation is similarly performed to the accessory battery 30 based on a constant DC voltage V2 (DC output voltage Vdcout2) as shown in FIG. 8G. However, since the switching elements Q5 to Q8 perform switching operation with a fixed duty ratio as described before, and a switching circuit is not provided at the accessory battery 30 side, amount of charge is limited in the accessory battery 30 side compared with the main battery 10 side at which the bidirectional circuit 13 is provided, and the switching elements Q1 to Q4 in the circuit 13 perform PWM operation, thereby the DC voltage V1 is gradually increased so that amount of charge can be controlled. As a result, preferential charge operation to the main battery 10 is performed.

Next, detail of the accessory-battery-prioritized charge operation is described with reference to FIGS. 9 and 11.

Here, FIGS. 11A to 11G show operation waveforms before the capacitor C2 is preferentially charged (accessory battery 30 is preferentially charged) based on the voltage V3, wherein FIG. 11A shows a switching control signal S5 or S8, FIG. 11B shows a switching control signal S6 or S7, FIG. 11C shows a voltage V21 generated between both ends of the winding 21 of the transformer 2, FIG. 11D shows a switching control signal S1 or S4, FIG. 11E shows a switching control signal S2 or S3, FIG. 11F shows the voltage V1 between both ends of the capacitor C1, and FIG. 11G shows the voltage V2 between both ends of the capacitor C2 respectively.

In the accessory-battery-prioritized charge operation, charge operation to the accessory battery 30 through the energy transfer path 73 shown in FIG. 10 (steps S401 to S408), and charge operation to the main battery 10 through the energy transfer path 72 shown in FIG. 10 (steps S411 to S420) are concurrently performed.

In charge operation to the accessory battery 30 (steps S401 to S408), first, when the voltage/current detection section 33 detects the DC voltage V2 between both ends of the capacitor 2 (step S401), the SW control section 6 determines whether a value of the DC voltage V2 is at least a predetermined threshold voltage Vth5, thereby the SW control section 6 estimates amount of charge of the accessory battery 30 (step S402). When the SW control section 6 determines the value of the DC voltage V2 is at least the threshold voltage Vth5 (constant-current charge operation to the accessory battery 30 is completed) (step S402: Y), operation is advanced to a subsequent step S405.

In the step S402, when the SW control section 6 determines the value of the DC voltage V2 is less than the threshold voltage Vth5 (constant-current charge operation to the accessory battery 30 is not completed) (step S402: N), the SW control section 6 outputs switching control signals S5 to S8 as shown in FIGS. 11A and 11B, and performs PWM control to the switching elements Q5 to Q8 (step S403), thereby preferentially performs constant-current charge operation to the accessory battery 30 (step S404). In this case, unlike the case of the main-battery-prioritized charge operation, since each of the switching elements Q5 to Q8 performs switching operation with a variable duty ratio according to PWM control, the DC voltage V2 is gradually increased as shown in FIG. 11G. As a result, preferential charge operation is performed to the accessory battery 30. After the constant-current charge operation, operation is returned to the step S401.

In the step S402, when the SW control section 6 determines the value of the DC voltage V2 is at least the threshold voltage Vth5 (constant-current charge operation to the accessory battery 30 is completed) (step S402: Y), the SW control section 6 outputs switching control signals S1 to S4, and performs PWM control to the switching elements Q1 to Q4 (step S405), thereby preferentially performs constant-voltage charge operation to the accessory battery 30 (step S406). Again in this case, unlike the case of the main-battery-prioritized charge operation, since each of the switching elements Q5 to Q8 performs switching operation with a variable duty ratio according to PWM control, the DC voltage V2 is gradually increased. As a result, preferential charge operation to the accessory battery 30 is performed.

After such constant-voltage charge operation, the voltage/current detection section 33 detects the DC voltage V2 between both ends of the capacitor C2 (step S407), and the SW control section 6 determines whether the value of the DC voltage V2 is at least a predetermined threshold voltage Vth6, thereby the SW control section 6 estimates charge amount of the accessory battery 30 (step S408). When the SW control section 6 determines the value of the DC voltage V2 is less than the threshold value Vth6 (constant-voltage charge operation to the accessory battery 30 is not completed) (step S408: N), operation is returned to the step S405. On the other hand, when the SW control section 6 determines the value of the DC voltage V2 is at least the threshold voltage Vth6 (constant-voltage charge operation to the accessory battery 30 is completed) (step S408: Y), the accessory-battery-prioritized charge operation is finished (return), and operation is returned to the first step S101 shown in FIG. 2.

On the other hand, in charge operation to the main battery 10 (steps S411 to S420), first, when the voltage/current detection section 11 detects the DC voltage V1 between both ends of the capacitor C1 (step S411), the SW control section 6 determines whether the value of the DC voltage V1 is at least the predetermined threshold value Vth3, thereby the SW control section 6 estimates charge amount of the main battery 30 (step S412). When the SW control section 6 determines the value of the DC voltage V1 is at least the threshold value Vth3 (constant-current charge operation to the main battery 10 is completed) (step S412: Y), operation is advanced to a subsequent step S416.

In the step S412, when the SW control section 6 determines the value of the DC voltage V1 is less than the threshold voltage Vth3 (constant-current charge operation to the main battery 10 is not completed) (step S412: N), the SW control section 6 triggers rising edges of the switching elements Q5 to Q8 performing switching operation according to variable duty control (step S413), thereby outputs switching control signals S1 to S4 while rising of the signals is synchronized with switching operation of the switching elements Q5 to Q8 as shown in FIGS. 11D and 11E, and performs PWM control to the switching elements Q1 to Q4 (step S414), and thereby performs constant-current charge operation to the main battery 10 (step S415). In this case, since any of the switching elements Q5 to Q8 and the switching elements Q1 to Q4 performs switching operation with a variable duty ratio according to PWM control, the DC voltage V1 is gradually increased as shown in FIG. 11F, and charge operation to the main battery 10 is performed. After the constant-current charge operation, operation is returned to the step S411.

In the step S412, when the SW control section 6 determines the value of the DC voltage V2 is at least the threshold voltage Vth3 (constant-current charge operation to the main battery 10 is completed) (step S412: Y), the SW control section 6 similarly triggers rising edges of the switching elements Q5 to Q8 (step S416), thereby outputs the switching control signals S1 to S4 while rising of the signals is synchronized with switching operation of the switching elements Q5 to Q8, and performs PWM control to the switching elements Q1 to Q4 (step S417), and thereby performs constant-voltage charge operation to the main battery 30 (step S418). Again in this case, since any of the switching elements Q5 to Q8 and the switching elements Q1 to Q4 performs switching operation with a variable duty ratio according to PWM control, the DC voltage V1 is gradually increased, and charge operation to the main battery 10 is performed.

After such constant-voltage charge operation, the voltage/current detection section 11 detects the DC voltage V1 between both ends of the capacitor C1 (step S419), and the SW control section 6 determines whether the value of the DC voltage V1 is at least a predetermined threshold voltage Vth4 or not, thereby the SW control section 6 estimates charge amount of the main battery 10 (step S420). When the SW control section 6 determines the value of the DC voltage V1 is less than the threshold value Vth4 (constant-voltage charge operation to the main battery 10 is not completed) (step S420: N), operation is returned to the step S416. On the other hand, when the SW control section 6 determines the value of the DC voltage V1 is at least the threshold voltage Vth4 (constant-voltage charge operation to the main battery 10 is completed) (step S420: Y), the accessory-battery-prioritized charge operation is finished (return), and operation is returned to the first step S101 shown in FIG. 2.

In this way, in the switching power supply unit of the embodiment, when the DC input voltage Vdcin is supplied from the main battery 10 and the bidirectional switching circuit 13 acts as the inverter circuit, the inputted DC input voltage Vdcin is converted into a pulse voltage by the bidirectional switching circuit 13, and the pulse voltage is transformed by the transformer 2. Then, the transformed pulse voltage is rectified by the rectifier circuit 31, and then supplied to the accessory battery 30 as the DC output voltage Vdcout2.

On the other hand, when the AC input voltage (commercial voltage) Vacin is inputted from the commercial power supply 50 via the input terminals T5 and T6, a pulse voltage based on the AC input voltage Vacin is generated by the switching circuit 51, and the bidirectional switching circuit 13 acts as a rectifier circuit. Therefore, a voltage is supplied to at least one of the bidirectional switching circuit 13 and the rectifier circuit 31 based on the inputted AC input voltage Vacin, so that a DC voltage (DC output voltage Vdcout1 or DC output voltage Vdcout2) is supplied to the main battery 10 or the accessory battery 30. Accordingly, even if the DC input voltage Vdcin is not supplied from the main battery 10, charge operation to the main battery 10 or the accessory battery 30 can be performed.

In the case of the charge operation to the main battery 10 or the accessory battery 30, when the main battery 10 is preferentially charged, the SW control section 6 performs control such that a duty ratio is fixed in switching operation of the switching circuit 51, and a duty ratio is variable in switching operation of the bidirectional switching circuit 13. On the other hand, when the accessory battery 30 is preferentially charged, the SW control section 6 performs control such that a duty ratio is variable in switching operation of each of the switching circuit 51 and the bidirectional switching circuit 13.

As hereinbefore, in the embodiment, when the main battery 10 is preferentially charged, the SW control section 6 performs control such that the duty ratio is fixed in switching operation of the switching circuit 51, and the duty ratio is variable in switching operation of the bidirectional switching circuit 13. On the other hand, when the accessory battery 30 is preferentially charged, the SW control section 6 performs control such that the duty ratio is variable in switching operation of each of the switching circuit 51 and the bidirectional switching circuit 13. Therefore, the main battery 10 and the accessory battery 30 can be subjected to appropriate charge operation based on the AC input voltage Vacin. Moreover, when the DC input voltage Vdcin is supplied from the main battery 10 and the bidirectional switching circuit 13 is operated as an inverter circuit, DC voltage conversion operation (DC/DC converter operation) is performed, in which the DC input voltage Vdcin is subjected to voltage conversion and then supplied to the accessory battery 30. Therefore, voltage conversion can be performed between the main battery 10 and the accessory battery 30. Accordingly, voltage conversion can be performed between the two batteries, and the batteries can be subjected to appropriate charge operation based on the inputted AC input voltage Vacin.

Moreover, since the bidirectional switching circuit 13 performs switching operation with a duty ratio not more than a duty ratio in switching operation of the switching circuit 51, power loss during switching operation can be reduced in the bidirectional switching circuit 13. Accordingly, power loss can be reduced similarly in the unit as a whole.

Moreover, the voltage/current detection sections 11 and 33 are provided, which detect amount of charge of the main battery 10 and the accessory battery 30 respectively, and the SW control section 6 controls preferential charge operation to one of the main battery 10 and the accessory battery 30 based on detection results given by the voltage/current detection sections 11 and 33. Therefore, preferential charge operation to one of the main battery 10 and the accessory battery 30 can be performed in consideration of charge amount of the two batteries.

Moreover, the voltage detection section 54 is provided, which detects presence of supply of the AC input voltage Vacin (DC voltage V53) from the input terminals T5 and T6, and when the SW control section 6 determines the AC input voltage Vacin is not supplied based on a detection result given by the voltage detection section 54, the SW control section 6 performs control such that DC voltage conversion operation (DC/DC converter operation) is performed, in which the DC input voltage Vdcin supplied from the main battery 10 is subjected to voltage conversion and then supplied to the accessory battery 30, and when the SW control section 6 determines the AC input voltage Vacin is supplied, the SW control section 6 performs control such that charge operation is performed to at least one of the main battery 10 and the accessory battery 30. Therefore, switching operation can be performed between DC voltage conversion operation and charge operation to the battery in consideration of presence of supply of the AC input voltage Vacin.

Furthermore, since the power factor correction circuit (PFC circuit 53) is provided between the switching circuit 51 and the input terminals T5 and T6, a power function can be corrected when the AC input voltage Vacin is subjected to voltage conversion, so that harmonic components can be reduced.

Second Embodiment

Next, a second embodiment of the invention is described. A switching power supply unit of the embodiment is different from the switching power supply unit of the first embodiment in substance of the accessory-battery-prioritized charge operation. The same components as those shown in the first embodiment are marked with the same references, and appropriately omitted to be described.

Figure 12:
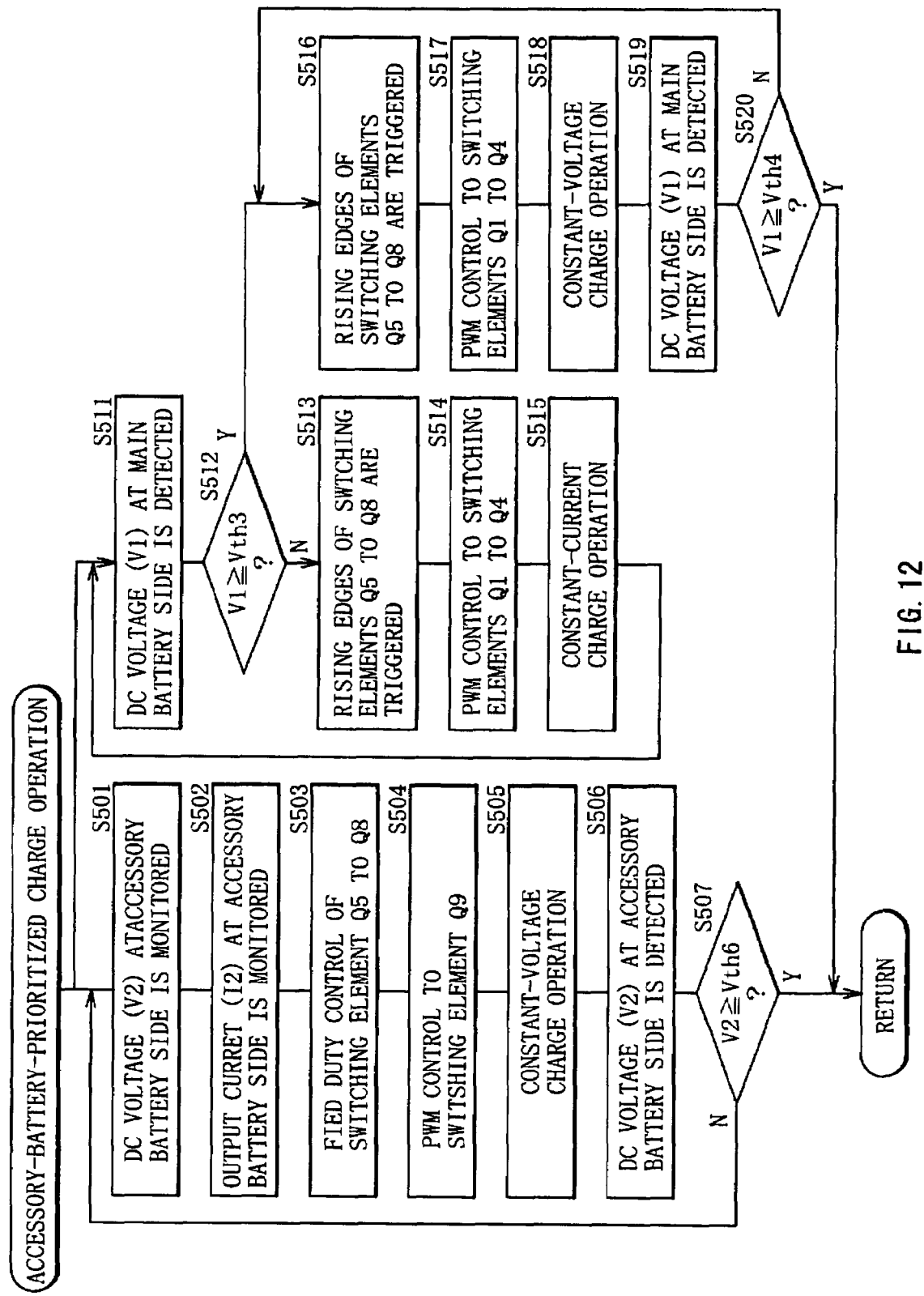
FIG. 12 is a flowchart showing a detailed example of accessory-battery-prioritized charge operation according to a second embodiment.
Figure 13:
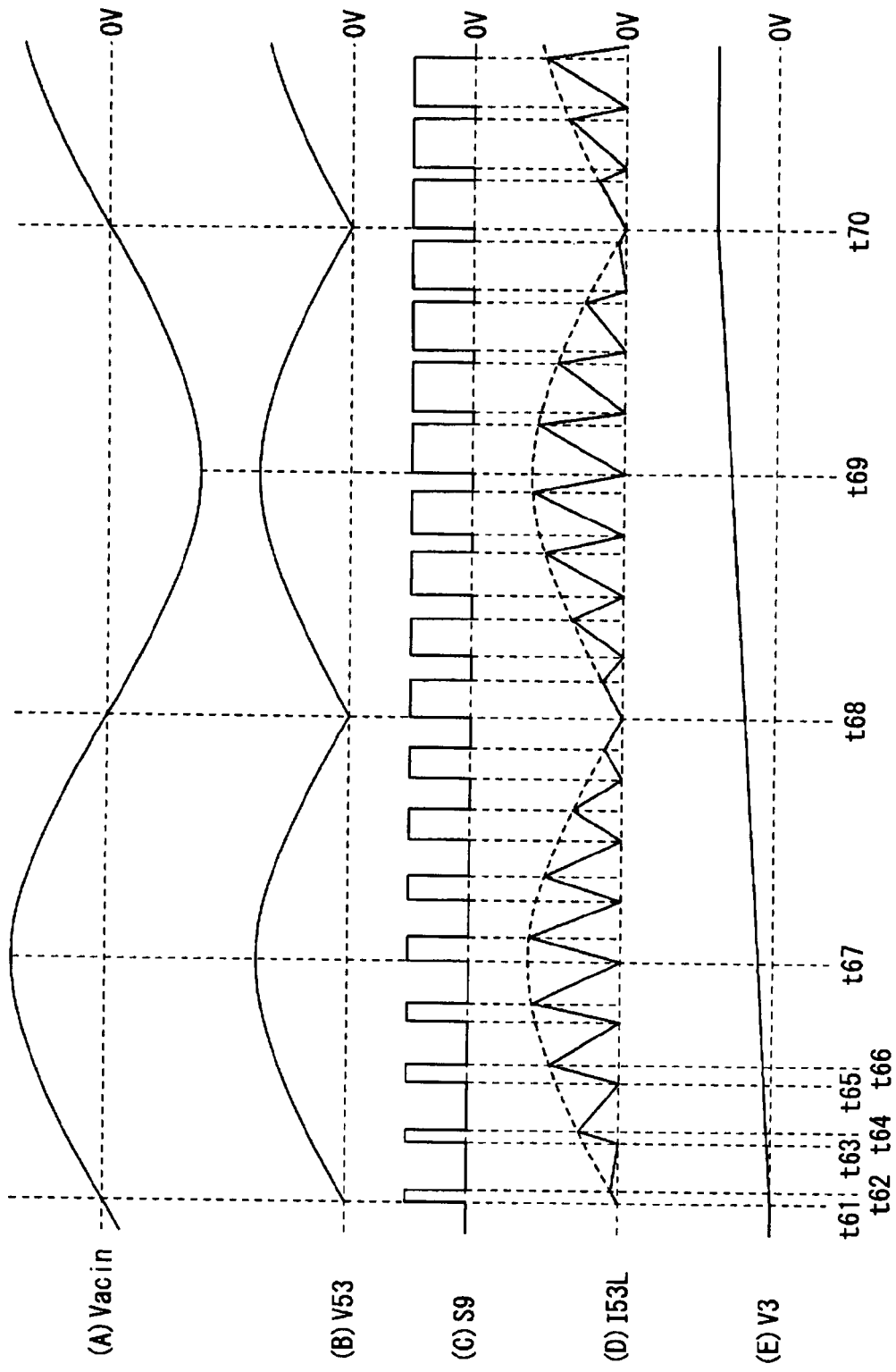
FIGS. 13A to 13E are timing waveform diagrams for explaining the accessory-battery-prioritized charge operation according to the second embodiment.

FIG. 12 shows in a flowchart detail of the accessory-battery-prioritized charge operation (corresponding to the step S115 shown in FIG. 2) in the switching power supply unit according to the embodiment. FIGS. 13A to 13E are waveforms of operation of respective circuits in the accessory-battery-prioritized charge operation in the embodiment (specifically, operation before the voltage V3 between both ends of the capacitor C3 is generated based on the AC input voltage Vacin), wherein FIG. 13A shows the AC input voltage Vacin, FIG. 13B shows an input voltage into the PFC circuit 53 (output voltage from the bridge circuit using the diodes 55D1 to 55D4) V53, FIG. 13C shows a switching control signal S9, FIG. 13D shows a current I53L flowing through the inductor L53, and FIG. 13E shows the voltage V3 between both ends of the capacitor C3 respectively.

Since the control operation, DC/DC converter operation, and main-battery-prioritized charge operation of the switching power supply unit are the same as those in the case of the first embodiment as shown in FIGS. 2, 3 and 5, description of them is omitted.

In the accessory-battery-prioritized charge operation in the embodiment, charge operation to the accessory battery 30 through the energy transfer path 73 shown in FIG. 10 (steps S501 to S507), and charge operation to the main battery 10 through the energy transfer path 72 shown in FIG. 10 (steps S511 to S520) are concurrently performed, as in the first embodiment. Between them, since charge operation to the main battery 10 is the same as that in the case of the first embodiment as shown in FIG. 9 (steps S411 to S420 in FIG. 9), description of the charge operation is omitted. That is, the accessory-battery-prioritized charge operation in the embodiment is different from that in the first embodiment in charge operation to the accessory battery 30 (steps S501 to S507).

In the charge operation to the accessory battery 30, first, the voltage/current detection section 33 detects the DC voltage V2 between both ends of the capacitor C2 and the DC current I2 flowing through the high voltage line LH3 respectively, and continuously monitors the voltage V2 and the current I2 (steps S501 and S502).

Next, the SW control section 6 performs fixed duty control to the switching elements Q5 to Q8 in the switching circuit 51 using switching control signals S5 to S8 (step S503). On the other hand, the SW control section 6 performs PWM control to the switching element Q9 in the PFC circuit 53 using a switching control signal S9 (step S504). Thus, the accessory battery 30 is subjected to constant-voltage charge operation (step S505). That is, in the first embodiment, while the switching element Q9 is subjected to PWM control so that the DC voltage V3 is constant, the switching elements Q5 to Q8 are subjected PWM control based on the detection result given by the voltage/current detection section 33, thereby pulse width of the pulse voltage supplied to the transformer 2 is changed so as to change an integral value of the pulse voltage. On the contrary, in the embodiment, the switching elements Q5 to Q8 are subjected to fixed duty control, and the switching element Q9 is subjected to PWM control based on the detection result given by the voltage/current detection section 33, thereby a voltage value of a pulse voltage supplied to the transformer 2 is changed so as to change an integral value of the pulse voltage.

Specifically, for example, as shown in a period of timing t61 to timing t70 in FIG. 13C, pulse width of the switching control signal S9 is gradually increased, thereby a value of the DC voltage (output voltage of the PFC circuit) V3 between both ends of the capacitor C3 is also gradually increased.

After such constant-voltage charge operation, as in the first embodiment, the voltage/current detection section 33 detects the DC voltage V2 between both ends of the capacitor C2 (step S506 in FIG. 12), and the SW control section 6 determines whether a value of the DC voltage V2 is at least a predetermined threshold voltage Vth6, thereby the SW control section 6 estimates amount of charge of the accessory battery 30 (step S507). When the SW control section 6 determines the value of the DC voltage V2 is less than the threshold voltage Vth6 (constant-voltage charge operation to the accessory battery 30 is not completed) (step S507: N), operation is returned to the step S501. On the other hand, when the SW control section 6 determines the value of the DC voltage V2 is at least the threshold voltage Vth6 (constant-voltage charge operation to the accessory battery 30 is completed) (step S507: Y), the accessory-battery-prioritized charge operation is finished (return), and operation is returned to the first step S101 shown in FIG. 2.

As hereinbefore, in the embodiment, when the main battery 10 is preferentially charged, as in the first embodiment, control is performed such that the duty ratio is fixed in switching operation of the switching circuit 51, and the duty ratio is variable in switching operation of the bidirectional switching circuit 13. On the other hand, when the accessory battery 30 is preferentially charged, the duty ratio is controlled to be fixed in switching operation of the switching circuit 51, and the duty ratio is made to be variable in switching operation by the switching element Q9 in the PFC circuit 53 based on the detection result given by the voltage/current detection section 33. Therefore, as in the first embodiment, the main battery 10 and the accessory battery 30 can be subjected to appropriate charge operation based on the AC input voltage Vacin. Moreover, as in the first embodiment, voltage conversion can be performed between the main battery 10 and the accessory battery 30. Accordingly, as in the first embodiment, voltage conversion can be performed between the two batteries, and the batteries can be subjected to appropriate charge operation based on the inputted AC input voltage Vacin.

Moreover, again in the embodiment, since the bidirectional switching circuit 13 performs switching operation with a duty ratio not more than a duty ratio in switching operation of the switching circuit 51, power loss during switching operation can be reduced in the bidirectional switching circuit 13. Accordingly, power loss can be similarly reduced in the unit as a whole.

While the invention has been described with the first and second embodiments hereinbefore, the invention is not limited to the embodiments, and can be variously modified or altered.

For example, in the embodiments, description was made on a case that when the accessory-battery-prioritized charge operation is performed, one of the switching elements Q5 to Q8 and the switching element Q9 was subjected to PWM control based on the detection result given by the voltage/current detection section 33 in order to charge the accessory battery 30. However, when the accessory-battery-prioritized charge operation is performed, both of the switching elements Q5 to Q8 and the switching element Q9 may be subjected to PWM control based on the detection result given by the voltage/current detection section 33 in order to charge the accessory battery 30.

Moreover, in the embodiments, description was made on a case that when the accessory-battery-prioritized charge operation is performed, one of the switching elements Q5 to Q8 and the switching element Q9 was previously set to be subjected to PWM control based on the detection result given by the voltage/current detection section 33. However, a switching element as an object of PWM control may be changed during the accessory-battery-prioritized charge operation.

Moreover, in the embodiments, description was made on a case that a duty ratio of each of the switching elements Q1 to Q4 was made variable in the accessory-battery-prioritized charge operation. However, the duty ratio of each of the switching elements Q1 to Q4 may be fixed in the accessory-battery-prioritized charge operation.

Moreover, when the accessory-battery-prioritized charge operation is performed, the duty ratio of each of the switching elements Q1 to Q4 may be set to be 0% so that only the accessory battery 30 is selectively charged.

Moreover, in the embodiments, description was made on a case that the SW control section 6 performed switching operation based on the voltage and current detected by the voltage/current detection sections 11, 33 and the voltage detection sections 52, 54. However, the SW control section 6 may perform switching operation in consideration of an external control signal such as a signal from ECU (Electronic Control Unit) in addition to such detection signals (or in place of such signals).

Moreover, in the embodiments, description was made on a case that constant-current charge operation was first performed, and then constant-voltage charge operation was performed in charge operation to the batteries. However, the batteries may be charged using only constant-current charge operation in some cases.

Furthermore, in the embodiments, description was made on a case that any of the switching circuits 11, 42 and 51 and the bidirectional switching circuits 13 and 55 is the switching circuit in the full bridge type. However, a configuration of the switching circuit is not limited to this, and for example, the switching circuit may be configured to be a switching circuit in a half bridge type.

What is claimed is:

1. A switching power supply unit, comprising:
a transformer including a first transformer coil, a second transformer coil, and a third transformer coil, the transformer coils being magnetically coupled with one another,
a first switching circuit disposed between the first transformer coil and a first DC power supply, and configured to include bidirectional switches,
a rectifier circuit disposed between the second transformer coil and a second DC power supply,
a second switching circuit disposed between the third transformer coil and AC voltage input terminals, and
a switching control section performing control such that when the first DC power supply is assigned higher priority in charging based on a AC input voltage inputted from the AC voltage input terminals, a switching duty ratio in the second switching circuit is set to be fixed, and a switching duty ratio in the first switching circuit is set to be variable, and when the second DC power supply is assigned higher priority in charging based on the AC input voltage, the switching duty ratio in the second switching circuit is set to be variable, and the first switching circuit performs switching operation.

2. The switching power supply unit according to claim 1:
wherein the switching control section performs control such that the first switching circuit performs switching operation with a switching duty ratio smaller than that of the second switching circuit.

3. The switching power supply unit according to claim 1:
wherein the switching power unit has first detection sections detecting amount of charge of at least one of the first and second DC power supplies, and
the switching control section performs control of preferential charge operation to one of the first and second DC power supplies based on a detection result given by the first detection sections.

4. The switching power supply unit according to claim 1:
wherein the switching power supply unit has a second detection section detecting presence of supply of an AC input voltage from the AC voltage input terminals, and
the switching control section performs control, based on a detection result given by the second detection section, such that when the AC input voltage is not supplied, a DC input voltage supplied from the first DC power supply is subjected to voltage conversion and then supplied to the second DC power supply, and
when the AC input voltage is supplied, at least one of the first and second DC power supplies is subjected to charge operation.

5. The switching power supply unit according to claims 1:
wherein a power factor correction circuit is further provided between the second switching circuit and the AC voltage input terminals.

6. A switching power supply unit, comprising:
a transformer including a first transformer coil, a second transformer coil, and a third transformer coil, the transformer coils being magnetically coupled with one another,
a first switching circuit disposed between the first transformer coil and a first DC power supply,
a rectifier circuit disposed between the second transformer coils and a second DC power supply,
a second switching circuit disposed between the third transformer coil and AC voltage input terminals,
a power factor correction circuit disposed between the second switching circuit and the AC voltage input terminals, and configured to include a switching element, and
a switching control section performing control such that when the first DC power supply is assigned higher priority in charging based on a AC input voltage inputted from the AC voltage input terminals, a switching duty ratio in the second switching circuit is set to be fixed, and a switching duty ratio in the first switching circuit is set to be variable, and when the second DC power supply is assigned higher priority in charging based on the AC input voltage, at least one of the switching duty ratio in the second switching circuit and a switching duty ratio in the switching element in the power factor correction circuit is set to be variable based on amount of charge of the second DC power supply, and the first switching circuit performs switching operation.

7. A switching power supply unit, comprising:
a transformer including a first transformer coil, a second transformer coil, and a third transformer coil, the transformer coils being magnetically coupled with one another,
a first switching circuit disposed between the first transformer coil and a first DC power supply, and configured to include bidirectional switches,
a rectifier circuit disposed between the second transformer coil and a second DC power supply,
a second switching circuit disposed between the third transformer coil and AC voltage input terminals, and
a switching control section performing control such that when the first DC power supply is assigned higher priority in charging based on a AC input voltage inputted from the AC voltage input terminals, a switching duty ratio in the second switching circuit which acts as an inverter circuit is set to be fixed, and a switching duty ratio in the first switching circuit which acts as a rectifier circuit is set to be variable, thereby charge operation is performed to the first DC power supply while a DC voltage outputted from the first switching circuit is changed and amount of charge of the first DC power supply is adjusted, and limited charge operation is performed to the second DC power supply compared with the first DC power supply while a DC voltage outputted from the rectifier circuit is fixed, and when the second DC power supply is assigned higher priority in charging based on the AC input voltage, the switching duty ratio in the second switching circuit which acts as an inverter circuit is set to be variable, and when the first switching circuit which acts as a rectifier circuit performs switching operation, thereby charge operation is performed to the second DC power supply while a DC voltage outputted from the rectifier circuit is changed and amount of charge of the second DC power supply is adjusted, and charge operation is performed to the first DC power supply based on the DC voltage outputted from the first switching circuit.

8. A switching power supply unit, comprising:
a transformer including a first transformer coil, a second transformer coil, and a third transformer coil, the transformer coils being magnetically coupled with one another,
a first switching circuit disposed between the first transformer coil and a first DC power supply,
a rectifier circuit disposed between the second transformer coils and a second DC power supply, a second switching circuit disposed between the third transformer coil and AC voltage input terminals, a power factor correction circuit disposed between the second switching circuit and the AC voltage input terminals, and configured to include a switching element, and a switching control section performing control such that when the first DC power supply is assigned higher priority in charging based on a AC input voltage inputted from the AC voltage input terminals, a switching duty ratio in the second switching circuit which acts as an inverter circuit is set to be fixed, and a switching duty ratio in the first switching circuit which acts as a rectifier circuit is set to be variable, thereby charge operation is performed to the first DC power supply while a DC voltage outputted from the first switching circuit is changed and amount of charge of the first DC power supply is adjusted, and limited charge operation is performed to the second DC power supply compared with the first DC power supply while a DC voltage outputted from the rectifier circuit is fixed, and when the second DC power supply is assigned higher priority in charging based on the AC input voltage, at least one of the switching duty ratio in the second switching circuit which acts as an inverter circuit and a switching duty ratio in the switching element in the power factor correction circuit is set to be variable, and when the first switching circuit which acts as a rectifier circuit performs switching operations, thereby charge operation is performed to the second DC power supply while a DC voltage outputted from the rectifier circuit is changed and amount of charge of the second DC power supply is adjusted, and charge operation is performed to the first DC power supply based on the DC voltage outputted from the first switching circuit.

\* \* \* \* \*